(12) United States Patent
Banerjee et al.

(10) Patent No.: US 6,964,747 B2
(45) Date of Patent: Nov. 15, 2005

(54) PRODUCTION OF DYED POLYMER MICROPARTICLES

(75) Inventors: Sukanta Banerjee, North Brunswick, NJ (US); Cecilia Georgescu, Piscataway, NJ (US); Eric S. Daniels, Bethlehem, PA (US); Victoria L. Dimonie, Bethlehem, PA (US); Michael Seul, Fanwood, NJ (US)

(73) Assignee: Bioarray Solutions, Ltd., Warren, NJ (US)

(*) Notice: Subject to any disclaimer, the term of this patent is extended or adjusted under 35 U.S.C. 154(b) by 385 days.

(21) Appl. No.: 10/348,123

(22) Filed: Jan. 21, 2003

(65) Prior Publication Data

US 2004/0139565 A1 Jul. 22, 2004

(51) Int. Cl.[7] ............................................... B01J 13/02
(52) U.S. Cl. .............. 264/4.1; 428/402.22; 428/402.24; 428/690; 264/4.32; 264/4.33; 264/4.4; 264/4.7; 524/86; 524/186; 524/543
(58) Field of Search .................. 428/402.22, 402.24, 428/690; 264/4.1, 4.32, 4.33, 4.7; 524/86, 186, 543

(56) References Cited

U.S. PATENT DOCUMENTS

| | | | |
|---|---|---|---|
| 3,790,492 A | 2/1974 | Fulwyler et al. | 252/635 |
| 4,267,235 A | 5/1981 | Rembaum et al. | 428/407 |
| 4,326,008 A | 4/1982 | Rembaum | 428/403 |
| 4,336,173 A | 6/1982 | Ugelstad | |
| 4,358,388 A | 11/1982 | Daniel et al. | |
| 4,459,378 A | 7/1984 | Ugelstad | |
| 4,487,855 A | 12/1984 | Shih et al. | 523/201 |
| 4,613,559 A | 9/1986 | Ober et al. | 430/137.17 |
| 4,654,267 A | 3/1987 | Ugelstad et al. | |
| 4,717,655 A | 1/1988 | Fulwyler | 435/7.2 |

(Continued)

FOREIGN PATENT DOCUMENTS

WO     WO 99/19515     4/1999

OTHER PUBLICATIONS

Okubo et al., *Colloid Polym. Sci.* (1991) 269:222–226.
Yamashita et al., *Colloids and Surfaces A.* (1999) 153:153–159.

(Continued)

*Primary Examiner*—Samuel A. Acquah
(74) *Attorney, Agent, or Firm*—Eric P. Mirabel; Daniel Monaco

(57) ABSTRACT

A dye, such as a fluorescent dye, is incorporated into polymer microparticles using a solvent system composed of a first solvent in which the dye and the microparticle polymer are soluble, a second solvent in which the dye and the microparticle polymer are not or only weakly soluble, and a third solvent in which the dye and the microparticle polymer are not or only weakly soluble. The first and second solvents are immiscible with each other, or at most partially miscible. The third solvent is miscible with the first and second solvents. The formulation provides substantially complete partitioning of the dye to the microparticles. The method may be used to obtain dyed polymer microparticle formed of cross-linked or non-cross-linked polymers. Libraries are provided comprising two or more sets of microparticles of different dye loadings. Fluorescent core-shell microparticles are produced from a mixture of microparticle cores incorporating one or more fluorescent dyes, a polymerization mixture comprising at least one polymerizable shell monomer, at least one free radical polymerization initiator comprising a water-insoluble oxidizing agent, and at least one water-soluble reducing agent.

46 Claims, 4 Drawing Sheets

U.S. PATENT DOCUMENTS

| | | | |
|---|---|---|---|
| 4,774,189 | A | 9/1988 | Schwartz ..................... 436/10 |
| 4,774,265 | A | 9/1988 | Ugelstad et al. |
| 4,795,698 | A | 1/1989 | Owen et al. |
| 4,829,101 | A | 5/1989 | Kraemer et al. ............ 523/201 |
| 4,873,102 | A | 10/1989 | Chang et al. |
| 4,996,265 | A | 2/1991 | Okubo et al. ............... 525/242 |
| 5,073,498 | A | 12/1991 | Schwartz et al. .............. 436/8 |
| 5,091,206 | A | 2/1992 | Wang et al. |
| 5,194,300 | A | 3/1993 | Cheung ................. 427/213.31 |
| 5,266,497 | A | 11/1993 | Imai et al. ................... 436/514 |
| 5,283,079 | A | 2/1994 | Wang et al. |
| 5,326,692 | A | 7/1994 | Brinkley et al. ............... 435/6 |
| 5,356,713 | A | 10/1994 | Charmot et al. |
| 5,395,688 | A | 3/1995 | Wang et al. ................ 428/327 |
| 5,512,439 | A | 4/1996 | Hornes et al. |
| 5,552,086 | A | 9/1996 | Siiman et al. |
| 5,573,909 | A | 11/1996 | Singer et al. .................. 435/6 |
| 5,648,124 | A | 7/1997 | Sutor |
| 5,698,271 | A | 12/1997 | Liberti et al. |
| 5,723,218 | A | 3/1998 | Haugland et al. ........... 428/402 |
| 5,736,349 | A | 4/1998 | Sasaki et al. |
| 5,763,203 | A | 6/1998 | Ugelstad et al. |
| 5,786,219 | A | 7/1998 | Zhang et al. ............... 436/523 |
| 5,866,099 | A | 2/1999 | Owen et al. |
| 5,952,131 | A | 9/1999 | Kumacheva et al. .......... 430/21 |
| 6,013,531 | A | 1/2000 | Wang et al. |
| 6,133,436 | A | 10/2000 | Koster et al. |
| 6,268,222 | B1 | 7/2001 | Chandler et al. ........... 436/523 |
| 2001/0026920 | A1 | 10/2001 | Chandler et al. |
| 2001/0046602 | A1 | 11/2001 | Chandler et al. |

OTHER PUBLICATIONS

Battersby et al., *J. Am. Chem. Soc.* (2000) 122:2138–2139.

Grondahl et al., *Langmuir* (2000) 16:9709–9715.

Lamb et al., *Biomacromolcules* (2001) 2(2):518–525.

Luo et al., *J. Polym. Sci.,* Part A: Polym. Chem. (2001) 39:2696–2709.

L. B. Bangs, *Uniform Latex Particles*, Seragen Diagnostics Inc., Indianapolis, Indiana (1987), p. 40.

Okubo, Shiozaki, Tsujihiro, and Tsukada. "Preparation of micron–size monodisperse polymer particles by seeded polymerization utilizing the dynamic monomer swelling method." Colloid and Polymer Science, 1991, 222–226, vol. 269, No. 3.

Okubo, and Yamashita. "Thermodynamics for the preparation of micron–sized, monodispersed highly monomer–'absorbed' polymer particles utilizing the dynamic swelling method." Colloids and Surfaces, 1999: 153–159.

Ghazaly, et al. "Synthesis and Characterization of a Macromonomer Crosslinker." Journal of Applied Polymer Science, 2000: 1362–1368. vol. 77.

Colombié, et al. "Role of Mixed Anionic–Nonionic Systems of Surfactants in the Emulsion Polymerization of Styrene: Effect on Particle Nucleation." Macromolecules, 2000: 7283–7291. vol. 33, No. 20.

B. J. Battersby, et al. "Toward Larger Chemical Libraries: Encoding with Fluorescent Colloids in Combinatorial Chemistry." J. Am. Chem. Soc., 2000: 2138–2139. vol. 122.

L. Gróndahl, et al. "Encoding Combinatorial Libraries: A Novel Application of Fluorescent Silica Colloids." Langmuir, 2000: 9709–9715. vol. 16, No. 25.

D. J. Lamb, et al. "Modification of Natural and Artificial Polymer Colloids by 'Topology–Controlled' Emulsion Polymerization", Biomacromolecules, 2001: 518–525. vol. 2, No. 2.

Luo and Schork. "Emulsion Copolymerization of Butyl Acrylate with Cationic Monomer Using Interfacial Redox Initiator System." Journal of Polymer Science, 2001: 2696–2709. vol. 39.

S. Lee and A. Rudin. "Control of Core–Shell Lat x Morphology". Polym r Latexes, E.S. Daniels t al. ACS Symposium; American Chemical Society, 1992: 234–253.

A. Van Blaaderen and Vrij. "Synthesis and Characterization of Colloidal Dispersions of Fluorescent, Monodisperse Silica Spheres." Langmuir, 1992: 2921–2931. vol. 8, No. 12.

Chang, Cho, Han, Kang, Kim, and Suh. "New Approach to Produce Monosized Polymer Microcapsules by the Solute Co–diffusion Method." Langmuir, 2001: 5435–5439. vol. 17, No. 18.

Liu and Yates. "Development of a Carbon Dioxide–Based Microencapsulation Technique for Aqueous and Ethanol–Based Latexes". Langmuir, 2002.

F. Caruso, et al. "Magnetic Nanocomposite Particles and Hollow Spheres Constructed by a Sequential Layering Approach." Chem. Mater., 2001:109–116. vol. 13, No. 1.

F. Caruso, et al. "Magnetic Core–Shell Particles: Preparation of Magnetite Multilayers on Polymer Latex Microspheres". Advanced Materials, 1999: 950–953. vol. 11, No. 11.

Caruso. "Nanoengineering of Particles Surfaces." Advanced Materials, 2001: 11–22. vol. 12, No. 1.

T.M. Liakopoulos et al. "A Bio–Magnetic Bead Separator On Glass Chips Using Semi–encapsulated Spiral Electromagnets." Center for Microelectronic Sensors and MEMS. Department of Electrical & Computer Engineering and Computer Science.

W. Wen et al. "Planar Magnetic Colloidal Crystals". Physical Review Letters, 2000: 5464–5467. vol. 85, No. 25.

PRODUCTION OF DYED POLYMER MICROPARTICLES

FIELD OF THE INVENTION

The invention relates to the production of dyed microparticles, such as microparticles that incorporated a fluorescent dye.

BACKGROUND OF THE INVENTION

Polymer particles containing an entrained solute, e.g., dye, are widely used as markers for biomolecules and as internal reference and calibration standards for assay detection methods such as flow cytometry. Four general methods have been described in the prior art for producing fluorescent polymer particles: (A) copolymerization of dye and monomer; (B) partitioning of water-soluble or oil-soluble dyes into preformed particles; (C) surface functionalization of preformed particles; and (D) encapsulation of dye droplets. In addition, polymerization methods also have been used to prepare core-shell particles, that is, microparticles comprised of a polymer core and a polymer shell.

A. Copolymerization Based Methods

Fluorescent microparticles may be synthesized by polymerization of monomeric units to form microparticles in the presence of fluorescent dyes. U.S. Pat. No. 4,326,008 to Rembaum (1982) describes the synthesis of fluorescent microparticles by copolymerization of functionalized acrylic monomer with a polymerizable fluorescent comonomer. The method generally requires a polymerizable dye molecule. Such methods, generally suffer from the drawback of possible inhibition of polymerization by the fluorescent dye and/or bleaching of the fluorescence by the reactive constituents of the polymerization reaction.

U.S. Pat. No. 4,267,235 to Rembaum (1981) describes the synthesis of polygluteraldehyde microspheres using suspension polymerization. Cosolubilized fluorescein isothiocyanate (FITC) is used to create fluorescent microspheres. Suspension condensation polymerization of the monomer with cosolubilized dye molecules, while largely circumventing dye destruction and polymerization inhibition, generates a broad particle size distribution and hence is not a suitable route for the production of monodisperse fluorescent microspheres.

U.S. Pat. No. 5,073,498 to Schwartz et al. (1991) describes a process for making fluorescent microparticles by seeded polymerization. One or more hydrophobic fluorescent dyes are dissolved in a solution containing monomer and initiator. The solution is added to pre-swollen microparticles. The patent discloses methods permitting the introduction of three different dyes into a particle. The method suffers from the drawback of possible inhibition of polymerization by the fluorescent dye, or conversely the bleaching of the fluorescence by the polymerization process.

Multi-stage emulsion polymerization has been employed to prepare core-shell particles without surface functional groups. U.S. Pat. No. 5,952,131 to Kumaceheva et al. discloses a method for preparing stained core-shell particles. The method is based on multiple stages of semi-continuous polymerization of a mixture of two monomers (methyl methacrylate and ethylene glycol dimethacrylate) and a fluorescent dye (4-amino-7-nitrobnezo-2-oxa-1,3 diazol-labeled methyl methacrylate). The particles are then encapsulated with an outer shell by copolymerization of methyl methacrylate and butylmethacrylate in the presence of chain transfer agent, dodecyl mercaptan. Kumaceheva et al. do not prepare and do not have as an object the inclusion of surface functional group core-shell polymer product.

U.S. Pat. No. 4,613,559 to Ober et al. discloses a method for preparing colored toner by swelling. Polystyrene particles (5.5 micron) are prepared by dispersion polymerization of styrene in the presence of ethanol, poly(acrylic acid), methylcellosolve and benzoyl peroxide. Swelling is performed by dispersing the polystyrene in an aqueous solution of sodium dodecyl sulfate and acetone. Colored particles are obtained by adding an emulsified dye solution (Passaic Oil Red 2144 in methylene chloride emulsified with an aqueous solution of sodium dodecylsulfate) to the particle dispersion.

Polymerization methods have been employed to prepare core-shell particles containing surface functional groups. U.S. Pat. No. 5,395,688 to Wang et al. discloses magnetically-responsive fluorescent polymer particles comprising a polymeric core coated with a layer of polymer containing magnetically-responsive metal oxide. The final polymer shell is synthesized with a functional monomer to facilitate covalent coupling with biological materials. The procedure of Wang et al. is based on three steps: (1) preparation of fluorescent core particles; (2) encapsulation of metal oxide in a polystyrene shell formed over the fluorescent core by free radical polymerization in the absence of emulsifier but with an excess of initiator; and (3) coating of the magnetic fluorescent particles with a layer of functional polymer. The functional polymer has carboxyl, amino, hydroxy or sulfonic groups. Wang et al. do not describe a method for obtaining the colored core and also does not address the problem of destruction of dye during the free radical polymerization process.

U.S. Pat. No. 4,829,101 to Kraemer et al. discloses two-micron fluorescent particles obtained by core-shell polymerization. The core is obtained at 80 C by polymerizing a mixture of isobutyl methacrylate, methyl methacrylate and ethylene glycol dimethacrylate via ammonium persulfate initiation. A shell is synthesized over the core by semi-continuously adding, in a first step, a mixture of the same monomers containing a fluorescent dye (fluoro-green-gold). Through the end of the reaction, two different monomer mixtures are added over a one hour period: a first mixture containing methyl methacrylate, ethylene glycol-bis-(methacrylate) and glycidyl methacrylate, and a second mixture containing methacrylamide and initiator. The polymerization is initiated with 4,4'-azobis-(cyanovaleric acid).

Okubo et al., *Colloid Polym. Sci.* 269:222–226 (1991), Yamashita, et al., *Colloids and Surfaces A.*, 153:153–159 (1999), and U.S. Pat. No. 4,996,265 describe production of micron-sized monodispersed polymer particles by seeded dispersion polymerization. Polymer seed particles are pre-swelled with large amounts of monomer prior to seeded polymerization. The swelling is carried out by slow, continuous, drop-wise addition of water to an ethanol-water mixture containing the seed particles, monomers, stabilizer and initiator. The addition of water decreases the solubility of the monomer in the continuous phase, leading to precipitation and subsequent absorption of monomer onto or into the seed polymer particles. The monomer absorbed into the seed polymer particle is then polymerized to produce large monodispersed polymer particles.

B. Partitioning of Water-Soluble or Oil-Soluble Dyes

Fluorescent particles can be produced by permitting dye molecules to partition into pre-swollen microparticles according to a technique originally described by L. B. Bangs (*Uniform Latex Particles*; Seragen Diagnostics Inc., 1984, p40). The process involves dissolution of a dye molecule or mixture of dye molecules in a solvent or solvent mixture of choice containing polymer microparticles. Absorption of the solvent by the microparticles leads to swelling, permitting the microparticles to absorb a portion of the dye present in the solvent mixture. The staining process is usually terminated by removing the solvent. The level of dye partitioning is controlled by adjusting the dye concentration, and in the case of a plurality of dyes, the relative abundance of individual dyes. Microparticles stained in this manner are quite stable and uniform. However, in many cases, depending on the choice of solvent system, a large dye excess is required to attain the desired partitioning, leading to significant loss of expensive dye material.

U.S. Pat. No. 5,723,218 to Haugland et al. (1998); U.S. Pat. No. 5,786,219 to Zhang et al. (1998); U.S. Pat. No. 5,326,692 to Brinkley et al. (1994); and U.S. Pat. No. 5,573,909 to Singer et al. (1996) describe protocols for producing various fluorescently-colored particles by swelling and dye partitioning in organic solvent and organic solvent mixtures. Various types of fluorescent particles, for example, fluorescent particles containing multiple dyes, particles exhibiting controllable and enhanced Stokes shifts, and particles displaying spherical zones of fluorescence, are described.

International patent application WO 99/19515 of Chandler et al. (1997) describes an improved method for the production of a series of ratiometrically-encoded microspheres with two dyes. A protocol for the production of 64 different encoded microspheres is reported. A swelling bath composition using a mixture of an organic solvent and alcohol (under anhydrous conditions) also is disclosed.

U.S. Pat. No. 5,266,497 to Matsudo et al. (1993) describes a method for generating a dye-labeled polymer particle which uses a hydrophobic dye dissolved in an organic solvent emulsified in water. The dyed particles were used for immuno-chromatographic purposes.

U.S. Pat. No. 4,613,559 to Ober et al. (1986) describes the synthesis of colored polymer particles using oil-soluble dyes. The disclosed method uses an emulsion of a dichloromethane dye solution in a water and acetone mixture for coloring the particles.

C. Functionalization of Internal or External Microparticle Surfaces

Production of fluorescent particles by surface functionalization involves the covalent attachment of one or more dyes to reactive groups on the surface of a preformed microparticle. This leaves the dye molecules exposed to the environment, which can hasten the decomposition of the dye. In addition, surface functionalization often renders a particle surface very hydrophobic, inviting undesirable non-specific adsorption and, in some cases, loss of activity of biomolecules placed on or near the particle surface. These problems can be circumvented by attaching a stained small particle, in lieu of a dye molecule, to the surface of a carrier particle. The efficacy of this method in generating large sets of encoded particles from a small number of dyes (ratio encoding) is unclear.

U.S. Pat. No. 4,487,855 to Shih (1984); U.S. Pat. No. 5,194,300 to Cheung (1993); and U.S. Pat. No. 4,774,189 to Schwartz (1988) disclose methods for preparation of colored or fluorescent microspheres by covalent attachment of either one or a plurality of dyes to reactive groups on the pre-formed particle surface. Battersby et al., "Toward Larger Chemical Libraries: Encoding with Fluorescent Colloids in Combinatorial Chemistry" *J. Am. Chem. Soc.* 2000, 122, 2138–2139; Grondahl et al., "Encoding Combinatorial Libraries: A Novel Application of Fluorescent Silica Colloids", *Langmuir* 2000, 16, 9709–9715; and U.S. Pat. No. 6,268,222 to Chandler et al. (2001) describe a method of producing fluorescent microspheres by attaching to the surface of a carrier microparticle a set of smaller polymeric particles that are stained.

D. Encapsulation Methods

Formation of fluorescent particles by encapsulation utilizes a solution of a preformed polymer and one or more dyes. In one approach, the solution is dispensed in the form of a droplet using a vibrating nozzle or jet, and the solvent is removed to produce polymer particles encapsulating the dye. This process requires specialized process equipment and displays only limited throughput. Alternatively, a polymer dye mixture is emulsified in a high-boiling solvent and the solution is evaporated to yield polymer-encapsulated dye particles. This process often generates non-spherical particles with broad size distribution.

U.S. Pat. No. 3,790,492 to Fulwyler et al. (1974) discloses a method to produce uniform fluorescent microspheres from a pre-dissolved polymer and dye solution using a jet. U.S. Pat. No. 4,717,655 to Fulwyler et al. (1988) discloses a process which includes two dyes in pre-designated ratios in a polymer microparticle to produce five distinguishable two-color particles.

The various prior art methods of producing fluorescent microparticles suffer from certain disadvantages. Where strong swelling solvents are used, the microparticles must be cross-linked to prevent them from disintegrating and deforming in the dye solution. This constraint represents a severe limitation since the majority of dyes require for their dissolution at any reasonable concentration solvent systems in which most polymer particles of interest, notably polystyrene particles, also will dissolve. These considerations have restricted the application of solvent swelling in the prior art to chemically stabilized ("cross-linked") microparticles. This restriction introduces additional difficulty and cost in microparticle synthesis; highly cross-linked particles are often very difficult to synthesize. Also, restriction to cross-linked particles limits the degree of microparticle swelling and thus the degree of dye incorporation. Specifically, the application of solvent swelling protocols of the prior art conducted on cross-linked microparticles generally limits penetration of the dye to the outer layer of the microparticle, thereby precluding uniform staining of the entire interior volume of individual particles and generally also precluding the realization of high levels of dye incorporation. What is needed is a staining process that can utilize non-cross-linked, as well as cross-linked, particles. What is needed is a method that will provide dye-loaded non-cross-linked polymer microparticles, which may be used, for example, to prepare libraries of dyed microparticles having containing different dyes and/or different dye amounts.

The degree of particle swelling in prior art solvent swelling-based methods of dye incorporation determines the rate of dye transport into the particles. Diffusion barriers lead to non-uniform dye distribution in the microparticles. For this reason, intense micro-mixing (brought about by either efficient mechanical mixing or by sonication) is required in order to produce uniformly stained populations of microparticles. These vigorous mixing procedures, while effective for laboratory scale preparation, are not easily adapted to larger scales. For example, sonication often requires specialized equipment such as probe sonicators, and limits the parallel completion of multiple staining reactions.

What is needed is a dyed particle manufacturing process that requires less vigorous mixing or no mixing.

Microparticles stained by prior art swelling methods are vulnerable to subsequent exposure to solvents that may cause substantial loss of dye and may preclude the implementation of protocols providing for multiple sequential dye incorporation steps.

In the prior art methods, high levels of dye partitioning frequently are not attainable because of the limited solubility of the dye in the bath. Even when solubility is not an issue, the low partition coefficients of many dyes requires a large excess of dye in solution with deleterious effects on subsequent bioanalytical assays. In fact, when carboxylate-modified beads are prepared by prior art solvent-swelling methods, the carboxyl function may become inoperative, and may be no longer available for functionalization by covalent coupling to other chemical groups. In addition, valuable dye material is lost in significant quantities. What is needed is a process for preparing fluorescent microparticles that achieves substantially complete dye incorporation even from poorly soluble dye/solvent formulations.

Further, what is needed is a reproducible method for preparing a plurality of distinguishable fluorescently encoded (colored) core-shell particles without destroying the dye.

SUMMARY OF THE INVENTION

A method of incorporating at least one dye into polymer microparticles is provided, comprising:

a) providing:
(i) at least one first solvent in which the dye and the microparticle polymer are soluble;
(ii) at least one second solvent in which the dye and the microparticle polymer are not or only weakly soluble, said first and second solvents being immiscible or at most partially miscible;
(iii) at least one third solvent in which the dye and the microparticle polymer are not or only weakly soluble, said third solvent being miscible with the first and second solvents;

(b) suspending the polymer microparticles in a designated volume of a mixture comprising at least one second solvent and at least one third solvent;

(c) adding to said polymer microparticle suspension a dye solution comprising at least one first solvent and at least one dye dissolved therein, the amount of dye corresponding to the desired final state of dye incorporation in the microparticles; and (d) adding to said polymer microparticle suspension at least one second solvent to induce substantially complete partitioning of the dye from the suspension liquid phase to the microparticles.

In another embodiment, the invention is a method of preparing a library of dyed polymer microparticles comprising two or more sets of microparticles of different dye loadings. The method comprises: forming a first set of microparticles according to the above dye incorporation method, the microparticles of the first set characterized by a first dye loading; and forming a second set of microparticles according to the above dye incorporation method, the microparticles of the second set being characterized by a second dye loading different from the first dye loading. The difference in dye loading between the microparticles of the first set and the microparticles of the second set may comprise a difference in at least one of dye concentration and dye identity.

The particles produced by the dye incorporation method of the invention may be used as the core for the formation of core-shell particles. The dye incorporation method thus optionally further comprises the step of forming polymer shells around the microparticles to provide core-shell fluorescent polymer microparticles.

According to another embodiment, a method for producing fluorescent core-shell microparticles is provided. The method comprises: (a) providing microparticle cores incorporating one or more fluorescent dyes; (b) contacting the microparticle cores with a polymerization mixture comprising at least one polymerizable shell monomer, at least one free radical polymerization initiator comprising a water-insoluble oxidizing agent, and at least one water-soluble reducing agent; and (c) polymerizing the shell monomer to form a polymer shell around the microparticle cores. The polymerization mixture preferably comprises an oil-in-water emulsion.

In one embodiment of the method for producing fluorescent core-shell microparticles, contacting the microparticle cores with the polymerization mixture comprises the steps of swelling the cores with a first mixture comprising the shell monomer and water-insoluble oxidizing agent to provide uptake of said first mixture into the cores, and then contacting the swelled microparticle cores with the water-soluble reducing agent. The polymerization mixture further optionally comprises at least one water-soluble free radical scavenger.

According to another embodiment of the invention, dyed polymer microparticle are provided comprising a non-cross-linked polymer, and at least one dye incorporated in the microparticle.

DESCRIPTION OF THE FIGURES

FIG. 1(*b*) is a diagram of the sequence of steps of an embodiment of the invention.

DETAILED DESCRIPTION OF THE INVENTION

According to the present invention, a method of producing stained polymer microparticles is provided. The method takes advantage of the fact that at ordinary temperature and pressures many organic liquids are immiscible or partially miscible in other organic liquids and in water. A third component, soluble in both immiscible liquids, will distribute itself between the two liquids. According to the present invention, these principles are utilized to obtain incorporation of dye into polymer microparticles. As illustrated below, the method is capable of producing a library of distinguishable dye-stained microparticles with reproducible dye encoding and minimal intra-sample variation of dye content. The dye encoding results from varying the dye loading of the particles. By "loading" with respect to the dye contained in a microparticle is meant the amount and/or character of the dye incorporated into the microparticle. The loading can thus vary by at least one property selected from the (i) amount of incorporated dye and (ii) the identity of incorporated dye. Encoding may thus take the form of varying the amount of a single dye as between different sets of microparticles, varying the chemical nature of the dye (using different dyes, or different combinations of dyes), or both.

Figure 1A:
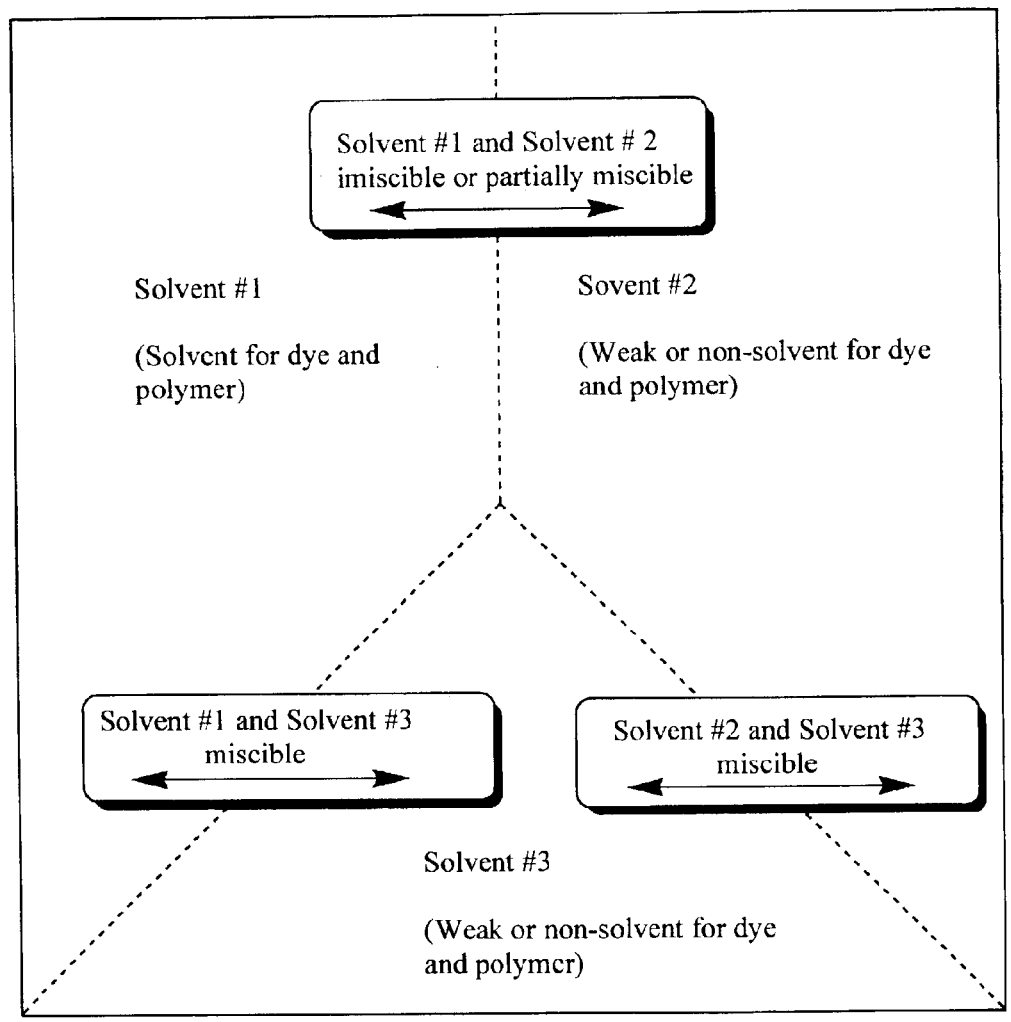
FIG. 1(*a*) is a schematic representation of a ternary solvent solution for use in the present invention.

A homogenous ternary solvent mixture according to the present invention for the preparation of dyed microparticles, particularly fluorescently-dyed microparticles, is schematically illustrated in FIG. 1(a). Solvent #1 is a strong solvent for both the dye and the polymer from which the microparticle is formed. Solvent #2 is a weak solvent or non-solvent for the dye and the polymer. In a preferred embodiment, Solvent #2 is an aqueous solvent, preferably water. Solvents #1 and #2 are either immiscible or partially miscible with respect to each other. A third solvent, Solvent #3, is a weak solvent or non-solvent for the dye and polymer, but serves as a co-solvent with respect to Solvents #1 and #2 in that it is miscible with both Solvents #1 and #2. In a preferred embodiment, Solvent #3 is an alcohol.

The prior art "swelling" methods of microparticle dye incorporation are limited by the narrow range of choices of available solvents for dyes of interest, requiring the use of cross-linked particles. These prior art methods involve identifying a solvent of choice in which the dye is soluble over a range of concentrations, and preparing a dye solution of desired concentration. Then, the dye solution is contacted with the polymer microparticles for a period of time so as to permit the dye to penetrate into in the microparticles.

Prior art swelling methods of fluorescent particle production suffer from limited dye solubility in the dye bath. Even when dye solubility is not an issue, the low partition coefficient of many dyes for the polymer requires a large excess of valuable fluorescent dye, which is lost. In contrast, the present invention produces microparticles of very high dye content, approaching 100% dye incorporation even from poorly soluble dye/solvent formulations. No dye is wasted by remaining in the solvent bath.

In contrast to prior art solvent swelling based methods, the dye incorporation method of the present invention may be used with equal efficacy for the dyeing of non-cross-linked as well as cross-linked particles. By "cross-linked" as describing a polymer comprising a microparticle is meant a polymer in which chains are joined together to form a three-dimensional network structure. Cross-linking can be carried out during the polymerization process by use of a cross-linking agent, that is, an agent that has two or more groups capable of reacting with functional groups on the polymer chain. Cross-linked polymers may also be prepared by the polymerization of monomers with an average functionality greater than two.

The invention thus provides, for the first time, dye-loaded microparticles that are composed of a non-cross-linked polymer. This is a significant improvement because highly cross-linked particles are often very difficult to synthesize. Furthermore, unlike many prior art particle dyeing methods which rely on intense mixing to achieve uniformity in dye staining of the microparticles, the present method requires only mild agitation. The mild agitation is required merely to keep the particles suspended. This is a significant improvement over prior art methods because the intense mixing of those methods requires specialized equipment and is difficult to scale up.

Polymer cross-linking generally restrains swelling of microparticles formed from cross-linked polymers, and also prevents penetration of the dye into the particle. As a result, the dye is restricted to a thin outer layer of the microparticle, and limits the dye loading. The ability to utilize non-cross-linked polymers as the microparticle material allows, for the first time, the production of dyed polymer microparticles that are characterized by a substantially uniform dye distribution throughout the volume of the microparticle. By "substantially uniform" is meant that the stained particle produces a symmetric and unimodal fluorescent intensity profile under conditions of fluorescent imaging. In contrast, a surface-stained particle (where the fluorescent agent is confined to the surface, or, in a shallow region close to the surface) produces a symmetric but bimodal fluorescent intensity profile.

Dyeing of functional group-modified microparticles by prior art selling methods may adversely affect the integrity of the functional group. As demonstrated by Example 28, below, functional group-modified particles may be dyed according to the practice of the present invention without loss of functional group integrity.

It will also be apparent from the description of the process of the invention that any polymer may be used to provide the polymer particles provided a stable dispersion of the polymer particles is available or can be made. The material may comprise a homopolymer or copolymer, the latter term meant to include not only polymers formed of two monomer units, but also polymers formed of three or more monomer units, sometimes termed "terpolymers". Hydrophobic polymers are preferred. Polymers comprising monomers of the vinyl class, that is, monomers containing the vinyl group, are particularly preferred, most particularly the styrene group. One group of preferred polymers includes polystyrene or polystyrene copolymers containing from about 50% to about 100% by weight styrene monomer units. The polymer optionally may be cross-linked or uncross-linked. In one embodiment, the microparticle is formed of polystyrene cross-linked with 1% divinylbenzene, based on the weight of the microparticle. In another embodiment, the microparticle comprises styrene/methacrylic acid copolymer containing from about 0.6 to about 1% methacrylic acid, based on the weight of the microparticle.

Suitable polymeric materials include, by way of example and not by way of limitation, polymers of the following monomers:

acrylic acid, or any ester thereof, such as methyl acrylate, ethyl acrylate, propyl acrylate, butyl acrylate, 2-ethyl hexyl acrylate or glycidyl acrylate;

methacrylic acid, or any ester thereof, such as methyl methacrylate, ethyl methacrylate, propyl methacrylate, butyl methacrylate, lauryl mathacrylate, cetyl methacrylate, stearyl mathacrylate, ethylene glycol dimethacrylate, tetraethylene glycol dimethacrylate, glycidyl methacrylate or N,N-(methacryloxy hydroxy propyl)-(hydroxy alkyl) amino ethyl amidazolidinone;

allyl esters such as allyl methacrylate;

itaconic acid, or ester thereof;

crotonic acid, or ester thereof;

maleic acid, or ester thereof, such as dibutyl maleate, dioctyl maleate, dioctyl maleate or diethyl maleate;

styrene, or substituted derivatives thereof such as ethyl styrene, butyl styrene or divinyl benzene;

monomer units which include an amine functionality, such as dimethyl amino ethyl methacrylate or butyl amino ethyl methacrylate;

monomer units which include an amide functionality, such as acrylamide or methacrylamide;

vinyl-containing monomers such as vinyl ethers; vinyl thioethers; vinyl alcohols; vinyl ketones; vinyl halides, such as vinyl chlorides; vinyl esters, such as vinyl acetate or vinyl versatate; vinyl nitriles, such as acrylonitrile or methacrylonitrile;

vinylidene halides, such as vinylidene chloride and vinylidene fluoride;

tetrafluoroethylene;

diene monomers, such as butadiene and isoprene; and allyl ethers, such as allyl glycidyl ether.

Particularly preferred homopolymers and copolymers comprising vinyl-containing monomers include polystyrene, poly(methyl methacrylate), polyacrylamide, poly(ethylene glycol), poly(hydroxyethylmethacrylate), poly(vinyltoluene) and poly(divinylbenzene).

Suitable polymeric materials may include, by way of example and not by way of limitation the following polymers: polyoxides, such as poly(ethylene oxide) and poly(propylene oxide); polyesters, such as poly(ethylene terepthalate); polyurethane; polysulfonate; polysiloxanes, such as poly(dimethyl siloxane); polysulfide; polyacetylene; polysulfone; polysulfonamide; polyamides such as polycaprolactam and poly(hexamethylene adipamide); polyimine; polyurea; heterocyclic polymers such as polyvinyl pyridine and polyvinyl pyrrolidinone; naturally occurring polymers such as natural rubber, gelatin, cellulose; polycarbonate; polyanhydride; and polyalkenes such as polyethylene, polypropylene and ethylene-propylene copolymer.

The polymeric material may contain functional groups such as carboxylates, esters, amines, aldehydes, alcohols, or halides that provide sites for the attachment of chemical or biological moieties desirable to enhance the utility of the particles in chemical or biological analyses. Methods for preparing microparticles from such polymers are well known in the art. Representative procedures for preparing microparticles as well as cross-linked microparticles are set forth in the Preparative Examples, below.

The methods of the present invention may also be applied to the staining of core-shell microparticles. Core-shell microparticles comprise a central core of one or more core polymers and a shell of one or more shell polymers containing the core. The polymer shell may be formed by any polymer-coating technique. Core-shell morphology is thermodynamically favored if the shell-forming polymer exhibits higher polarity, or lower interfacial tension than does the core-forming polymer. Core-shell morphology also is favored if the volume fraction of the shell-forming polymer is greater than that of the core-forming polymer. Thus, synthesis of core-shell particles is performed at a shell/core weight ratio greater than 1. In certain embodiments, the core polymer is hydrophobic and the shell polymer is relatively hydrophilic and carries functional groups of interest.

Copolymers of styrene and a monomer more hydrophilic than styrene (e.g., methacrylic acid) are preferred for the core polymer over polystyrene homopolymer. The comonomer serves to decrease the hydrophobicity of the core and to render it more compatible with the hydrophilic shell polymerization compositions.

Within these constraints, any monomer or combination of monomers may be selected as the shell polymer. A mixture of vinyl monomers is preferred. According to one embodiment of the invention, a monomer mixture of methyl methacrylate as the major constituent, and hydroxyethyl methacrylate and methacrylic acid as minor constituents, is used to form a shell over a polystyrene or modified polystyrene core. One such monomer mixture is composed of by weight about 6% hydroxyethyl methacrylate, from about 5% to about 20% methacrylic acid, the balance being methyl methacrylate. These monomers are more hydrophilic than polystyrene.

Microparticle size may be chosen appropriately for the intended end use. Typically, particles will range in size from about 0.1 to about 100 microns in diameter, more typically from about 0.5 to about 50 microns, even more typically from about 2 to about 10 microns. Preferably, the microparticles are "monodisperse", that is, microparticles in a set have a narrow size range, preferably displaying a coefficient of variation of the mean diameter ("CV") of no more than about 5%.

Microparticles may be rendered magnetically responsive by incorporation of an appropriate magnetic material, before or after staining, according to well-known procedures. According to one such method, particles are impregnated with a ferrofluid, such as a ferrofluid prepared according to Example 19. By "magnetically responsive" is meant the ability to change location or orientation in response to application of a magnetic field.

The dye may comprise any dye that imparts a visual or machine-observable color or fluorescence. The color or fluorescence may be detectable with the naked eye or with the aid of a microscope or other optical instrument. The preferred fluorescent dyes are styryl dyes, such as p-bis(o-methylstyryl)benzene; pyromethane dyes such as fluorescent green dye 4,4-difluoro-5,7-dimethyl-4-bora-3a,4a-diaza-s-indacene-3-pentanoic acid, succinimidyl ester and the fluorescent orange dye 4,4-difluoro-5-(2-thienyl)-4-bora-3a,4a-diazo-s-indacene-3-propionic acid-succinimidyl ester; and coumarin dyes such as methoxycoumarin. Preferred are those fluorescent dyes having emission wavelengths in the range from about 400 nm to about 1000 nm. When more than one dye is used, the dyes can be selected so that they have substantially different absorption spectra, emission spectra or emission lifetimes.

According to one embodiment, the microparticle comprises a polystyrene polymer or copolymer and the dye is a hydrophobic dye. Possible solvents are selected, for example, from Table 1.

TABLE 1

Candidate solvents for polystyrene microparticle and hydrophobic dye combination

| Solvent #1: Good solvent for hydrophobic dye and polystyrene microparticle (Dye Solvent) | Solvent #2: Weak solvent or non-solvent for hydrophobic dye and polystyrene microparticle | Solvent #3: Weak solvent or non-solvent for hydrophobic dye and polystyrene microparticle (Co-Solvent) |
|---|---|---|
| methylene chloride chloroform tetrahydrofuran dioxane cyclohexane benzene toluene butylacetate lower chlorinated aliphatic hydrocarbons. | water | Acetone lower alcohols, especially methanol, ethanol and isopropanol |

A representative system utilizing a polar, water-soluble dye is composed of poly(ethylene oxide) microparticles in a ternary solvent system comprising water as Solvent #1; hexane as Solvent #2; and dioxane as Solvent #3.

From the solvents listed in the above table and a standard solvent miscibility chart, several ternary solvent systems may be designed for a combination of polystyrene polymer or copolymer and hydrophobic dye in accordance with the present invention. For example, a hydrophobic dye solute may be dissolved in a liquid phase consisting of a homogeneous ternary mixture of water (Solvent #2), alcohol (co-solvent, Solvent #3) and dichloromethane (dye solvent, Solvent #1) and contacted with a solid polymeric phase consisting of polystyrene or polystyrene copolymer microparticles. In addition to the water/alcohol/dichloromethane ternary system disclosed, other representative ternary systems include, for example, water/acetone/methylene chloride.

The invention has been described for purposes of illustration as containing one each of Solvent #1, Solvent #2 and Solvent #3, the characteristics of which have been described above. However, it is possible to practice the invention by including more than one solvent in each category. For example, the solvent mixture may contain a single solvent of type #1, two solvents of type #2, and a single solvent of type #3.

The microparticles of the invention may be functionalized to include chemical or biological entities such as, for example, nucleic acids and fragments thereof, including aptamers, proteins, peptides, and small organic molecules. The attachment of such molecules can be performed using processes known in the art, for example, a covalent coupling reaction. See, e.g., G. T. Hermanson, *Bioconjugate Techniques* (Academic Press, 1996) and L. Illum, P. D. E. Jones, *Methods in Enzymology* 112, 67–84 (1985), the entire disclosures of which are incorporated herein by reference. These entities can be selected depending on the assay of interest. Examples of such assays are disclosed in PCT/US01/20179 and U.S. Pat. No. 6,251,691, which are incorporated herein by reference in their entirety.

Figure 1B:
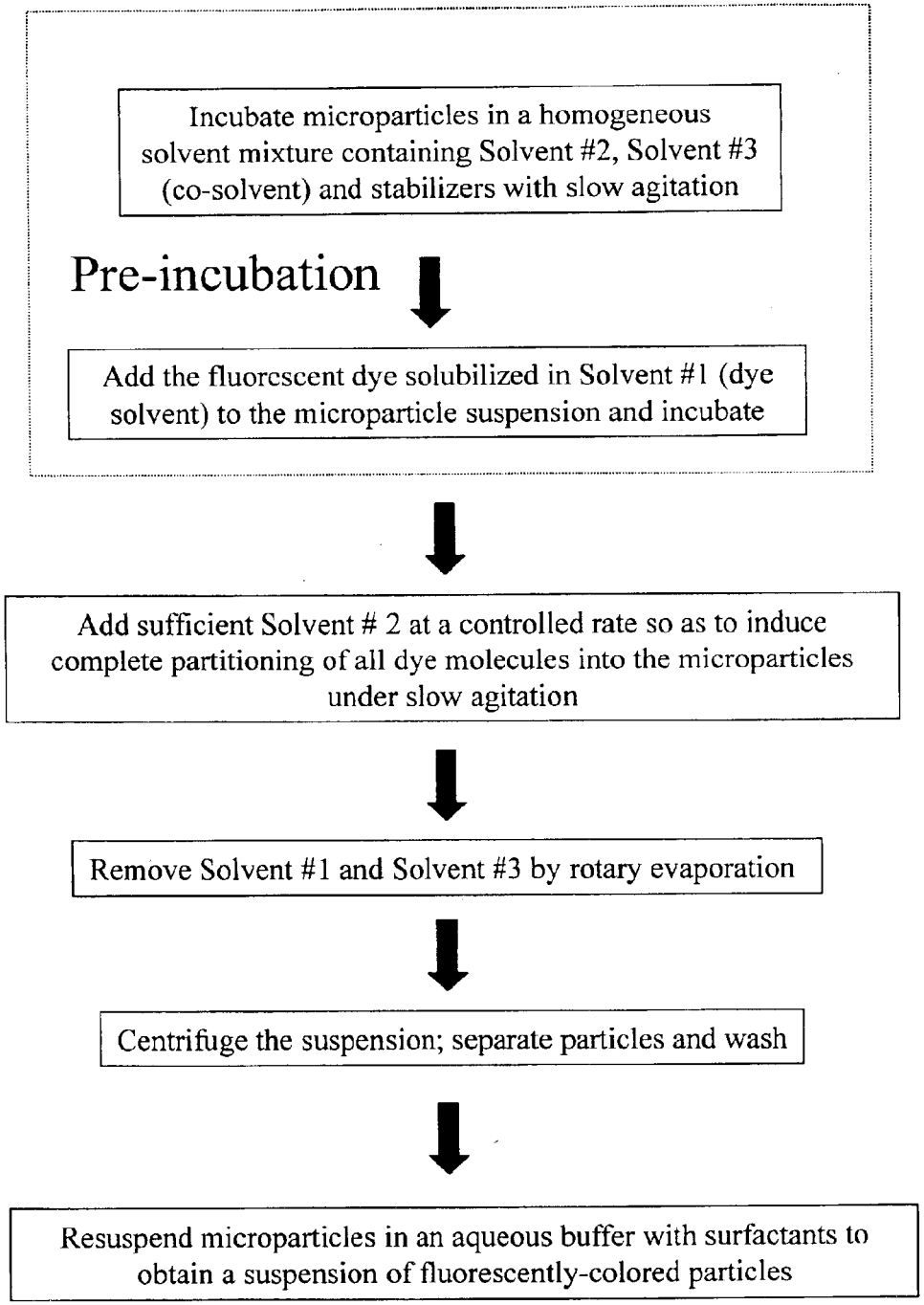

One embodiment of the method of the invention is diagrammatically summarized in FIG. 1(b). Microparticles are first incubated with a solvent solution comprising Solvent #2 and Solvent #3 in the presence of one or more optional suspension stabilizers to form a suspension. The function of the stabilizer is to prevent the destabilization of the suspension of microparticles. Representative suspension stabilizers include polymers, particularly polymeric alcohols, such as polyvinyl alcohol; polymeric oxides, such as polyethylene oxide; polyvinyl polymers, such as polyvinylpyrrolidone; poly acids, such as polyacrylic acid. Other representative stabilizers include ionic surfactants, such as sodium dodecylsulfate and Aerosol OT; and non-ionic surfactants, such as polyoxyethylene sorbitan monolaurate and polyethyleneglycol tert-octylphenyl ether. The concentration of the stabilizer preferably ranges from about 0% to about 2%, by weight of the solvent/microparticle suspension.

The suspension is preferably subjected to slow agitation. The incubation is typically conducted at room temperature, but higher or lower temperatures may be utilized so long as the integrity of the microparticles is not adversely affected, and the solvent composition remains stable. The incubation is conducted to permit the optional stabilizer to adsorb onto the microparticles. The requisite pre-incubation time will vary according to the composition of the solvents and microparticles, and may be selected accordingly.

Following the above first incubation step, dye solubilized in dye solvent (Solvent #1) is then added to the microparticle suspension. Sufficient dye should be added to ensure incorporation of dye to the desired level in order to generate a detectable dye signal. The incubation is carried typically out at room temperature, but higher or lower temperatures may be used. The second incubation is conducted to permit the dye solvent (Solvent #1) to penetrate the microparticles.

It has been found that the combination of a first step of incubating particles with a mixture of a Solvent #2 and a Solvent #3, and optional stabilizers(s), followed by a second step of adding dye dissolved in Solvent #1, substantially decreases the need for intense mechanical or acoustic mixing during the dyeing step, as required by prior art protocols. The particles require only mild agitation during the dyeing process in order to keep them suspended. This is a significant improvement because intense mixing requires specialized equipment and is difficult to scale up.

According to one embodiment, the concentration of dye in the microparticle suspension is selected in the range from about 1 $\mu$g/g of particles to about 100 $\mu$g/g of particles, based upon the weight of the particle suspension. Concentrations below and above this range may be appropriate in some applications depending on the composition of the solvent solution and microparticles.

The rate of dye addition is selected to ensure the stability of the system and to avoid non-uniformity, that is, to prevent precipitation of the dye outside the microparticle phase. The suspension is slowly agitated.

Solvent #2 is then slowly added to the microparticle suspension to drive the dye into the microparticles. Solvent #2 should be added at a controlled rate to maintain phase stability in the suspension. By "phase stability" is meant a condition characterized by the presence of an essentially homogeneous mixture of solute (dye) and liquid phase. Under a condition of phase stability, the dye remains dissolved in the solution phase while being incorporated into the microparticles. The dye does not precipitate out of the solvent. Phase stability is further characterized by the absence of liquid-liquid phase separation.

Solvent #2 is added until complete partitioning of the dye to the microparticles is achieved. This means that Solvent #2 is added at least until no more dye is apparent in the suspension continuous phase, signaling that substantially all the dye introduced into the system has been take up by the microparticle phase. The substantial absence of dye in the continuous phase may be monitored visually, or by an appropriate instrument, depending on the nature of the dye. For example, the continuous phase may be monitored using a UV spectrometer or fluorescence spectrometer.

Complete uptake of the dye into the microparticle phase must be obtained so that the dye loading of the microparticles may be derived with certainty, based upon the initial dye amount in the solvent bath and the microparticle volume. The precise level of dye loading should be known to ensure that the dye signal emitted is within the dynamic range of instruments utilized for detecting that signal. An accurate determination of the dye loading is particularly important when a library of particles is to be constructed, and different particle sets are to be distinguished by different loadings of the same dye.

To complete the process, the microparticle suspension is centrifuged, and the microparticles are optionally washed and resuspended in a suitable buffer, typically an aqueous buffer containing optional surfactants. The resulting microparticles comprise a set of dyed particles containing a pre-determined, specific amount of dye that permits the identification of particles from a given set.

The method of the present invention may be adapted to provide a library of combinatorially encoded microparticles by sequential addition of solutions of distinguishable fluorescent dyes. The microparticles are encoded in accordance with any one of a variety of available codes, including binary codes. Preferably, the microparticles are encoded with a binary encoding method that permits in-situ decoding, such as the method of WO 98/53093, the entire disclosure of which is incorporated herein by reference.

A polymer shell is may be optionally formed over the fluorescently-encoded core particles. Core-shell microparticles comprise a central core comprising one or more core polymers surrounded by a shell comprising one or more shell polymers. The polymer shell may be formed by any polymer-coating technique.

Accordingly, microparticles comprising a core polymer containing one or more fluorescent dyes are prepared, as described above. Shells formed of a second polymer distinct from the core-forming polymer are then formed around the cores to provide core-shell fluorescent microparticles.

According to one embodiment of the invention, a seeding polymerization method is utilized which was formulated and optimized to give the desired core-shell morphology and desired final targeted particle size, while minimizing the formation of excess water-soluble polymer, oversized particles and or coagulum. A desired size is characterized by a finished core-shell particle diameter varying from about 1.05 to 1.5 times the diameter of the particle core. Core-shell morphology is thermodynamically favored if the shell-forming polymer is more polar, or its interfacial tension smaller, than that of the core-forming polymer. Core-shell morphology is also favored where the volume fraction of the shell-forming polymer is greater than that of the core-forming polymer. Thus, synthesis of the core-shell particles according to the present invention is performed at a shell/core weight ratio greater than 1. In certain embodiments, the core polymer is hydrophobic and contains encapsulated fluorescent dye(s) and the shell polymer is relatively hydrophilic and carries functional groups of interest.

Within these constraints, any monomer or combination of monomers may be selected for forming the shell polymer around the dye core particles. A mixture of vinyl monomers is preferred. According to one embodiment of the invention, a shell-forming monomer mixture is employed for use in forming a shell around a polystyrene-based core. The mixture consists of methyl methacrylate as the major monomer, and hydroxyethyl methacrylate and methacrylic acid as minor monomers. One such monomer mixture is composed of by weight about 6% hydroxyethyl methacrylate, from about 5% to about 20% methacrylic acid, the balance being methyl methacrylate. These monomers are more hydrophilic than polystyrene.

Copolymers of polystyrene and a monomer more hydrophilic than styrene (e.g.; methacrylic acid) are preferred for the core polymer over polystyrene homopolymer. The comonomer, serves to decrease the hydrophobicity of the core and make it more compatible with the hydrophilic shell polymerization system.

A redox system, similar to a system described by Lamb, et al., *Biomacromolecules,* 2001, 2(2) 518–525 and Luo et al., *J. Polym. Sci.,* Part A: Polym. Chem., 2001, 39, 2696, (both incorporated herein by reference) is used to generate the shell. The system has two components: a water-insoluble hydrophobic oxidizing agent and a water-soluble reducing agent. A polymerization mixture for forming the shell around the microparticle core comprises at least one polymerizable shell monomer, at least one free radical polymerization initiator comprising a water-insoluble oxidizing agent, and at least one water-soluble reducing agent. The mixture is preferably in the form of an oil-in-water emulsion. The oxidizing agent serves as the polymerization initiator. This allows confinement of the radical generation and hence also the localization the polymerization reaction at the particle-solution interface. This, in turn, provides for minimization of aqueous homopolymerization of the hydrophilic monomers employed for shell polymerization. A water-soluble radical scavenger, as $CuCl_2$, is preferably included to suppress the formation of water-soluble polymer.

The shell-forming process involves free radical-initiated interfacial polymerization. The interfacial nature of the redox polymerization serves to prevent the free radical-mediated destruction of the hydrophobic dye present in the polymer core.

Examples of the water-insoluble hydrophobic oxidizing agents include are hydrophobic organic peroxides and hydroperoxides such as cumene hydroperoxide and t-butylperoxy-2-ethylhexanoate ("BPH"). Examples of water-soluble reducing agents include tetraethylenepentamine and sodium formaldehydesulfoxylate ("SFS").

In the shell polymerization process of the invention, the core "seed" particles, dyed as provided above, are first swollen with the shell monomer and an organic initiator, e.g., BPH, which is completely insoluble in water. Polymerization of the shell monomer(s) is carried out either in a batch or semicontinuous mode. In a semicontinuous process, the initiator is first introduced into the core particles along with a small part of shell monomer. After this, the monomer-oil initiator swelled core particles are mixed with water-soluble reducing agent (e.g., SFS) and water-soluble radical scavenger (e.g., $CUCl_2$) solutions and the polymerization is started at elevated temperature, e.g., 45° C. The remainder of the shell monomer is fed to the reaction mixture over a period of time. During the entire polymerization process the monomer-oil initiator swelled particles are kept suspended in a surfactant water solution.

The result is a functional hydrophilic polymer shell synthesized on a stained polymer core microparticle by emulsion polymerization. Specifically, the polymerization process is initiated by a redox couple, wherein, one component is hydrophobic and the other is hydrophilic. This ensures that the radical formation is confined selectively to the particle interface, which prevents destruction of the encapsulated dyes by the free radicals generated during the polymerization process. This is an improvement over the prior art that has failed to provide a reproducible method allowing production of a plurality of distinguishable fluorescently encoded core-shell particles without destroying the encapsulated dyes.

The post-staining formation of the shell polymer also ensures that the surface properties of the subject fluorescent microparticles are not substantially different from the surface properties of the undyed particles. It is well known that presence of dye molecules on the particle surface invites non-specific binding and often dramatically affects the biological activity of the probe molecules resident on the particle surface.

The shell polymerization of the present invention also allows the subject fluorescent microparticles to be prepared with a variety of surface properties, with functional groups including but not limited to sulfate, phosphate, hydroxyl, carboxyl, ester, amide, amidine, amine, sulfhydryl and aldehyde. The microparticles of the invention may be further functionalized to include attached chemical or biological entities that comprise, for example, oligonucleotides, polynucleotides, peptides and polypeptides. These entities can be selected depending on the assay of interest. Examples of such assays are disclosed in PCT/US01/20179 and U.S. Pat. No. 6,251,691, the entire disclosure of which are incorporated herein by reference.

The practice of the invention is illustrated by the following non-limiting examples. Average particle size was determined using a Nikon Eclipse TE 300 optical microscope as follows. Uniform packed arrays of particles were viewed. The center-to-center distance for a row of a minimum of 5–10 particles was measured and divided by the (n-1) number of particles. The coefficient of variation (CV) was measured from pictures taken with a JEOL 6300F Scanning Electron Microscope at various magnifications. A minimum of 300 particles was measured and a MACROS program was used to calculate various particle size averages and standard variation.

PREPARATIVE EXAMPLE 1

Non-Cross-Linked Polystyrene Homopolymer Particles

A 100-ml round bottom glass flask, equipped with a reflux condenser, $N_2$ inlet-outlet adapter and an agitator, was placed in a jacketed oil bath. The flask was charged with a solution of 0.9475 g of polyvinylpyrolidone (Aldrich, average molecular weight about 29,000) in 43.3 ml of ethyl alcohol (Aldrich, 200 proof, anhydrous, 99.5%) and 18.95 g styrene. In order to remove free oxygen, the system was purged with $N_2$ for one half hour under mild agitation (50–70 rpm). Then, the temperature was raised to 70° C. and the agitator speed to 350 rpm. Polymerization of styrene monomer was initiated by adding 10 ml of a solution of 2.4 wt % 2,2'-azobisisobutyronitrile in ethanol. After 17 hours of reaction, the system was cooled to room temperature. Monodisperse polystyrene particles having an average volume diameter of 4.1 μm were obtained. The monomer conversion efficiency was 96.4% and the solids content of the final latex was 27.9%.

PREPARATIVE EXAMPLE 2

Divinylbenzene Cross-Linked Polystyrene Particles

This example illustrates the preparation of a divinylbenzene cross-linked particle core. A 100-ml round bottom flask equipped with a reflux condenser, $N_2$ inlet-outlet adapter, and agitator was placed in a jacketed oil bath. The flask was charged with 1.5 g of polyvinylpyrolidone (as in Preparative Example 1), 0.475 g of sodium dioctyl sulfosuccinate (Aldrich, 98%), 53.5 ml of ethyl alcohol (Aldrich, 200 proof, anhydrous, 99.5%), 9.405 g styrene and 0.095 g divinylbenzene (Aldrich, mixture of isomers, 80% purity). After removing free oxygen by purging with $N_2$ for 30 min., the temperature was raised to 70° C. The polymerization was initiated by adding 0.095 g of 4,4'-azobis(4-cyanovaleric acid) (Aldrich, 75%) dissolved in 10 ml of ethanol. After 27 hours, the reaction was stopped by cooling to room temperature. Monodisperse particles were obtained. The monomer conversion efficiency was 93% and the particle volume average diameter was 1.6 μm.

PREPARATIVE EXAMPLE 3

Non-Cross-Linked Carboxyl Particles

The same procedure as in Preparative Ex. 2 was used to prepare polystyrene copolymer with 1% or 0.6% methacrylic acid. The ingredient amounts, polymerization conditions and particle size are presented in Table 2 (NaDOSS=sodium dioctyl sulfosuccinate; ACVA=azobis(4-cyanovaleric acid); AIBN=2,2'-azo-bis-isobutyronitrile; PVP K30=polyvinylpyrrolidone, about 30,000 dalton molecular weight). Recipe IV (Table 1) was applied by bottle polymerization. In a 1.5 L glass bottle was charged a solution of PVP K30 in 1115 ml ethanol. To it was added 225 g styrene and 2.25 g of methacrylic acid. The bottle was sealed and agitated end over end for 30 min. The mixture was divided into 5 equal parts and charged in 5 glass bottles of 500 ml each. The bottles were bubbled with $N_2$ for 15 min. and cap-sealed. Separately, a solution of 2.25 g AIBN in 10 ml ethanol was prepared. Then 2.45 ml of initiator solution was added rapidly to each bottle with a 3 ml syringe. The bottles were capped and placed in a tumbler thermostatted at 70° C. and agitated end-over-end for 24 hours. The particle sizes were 2.2 μm for one latex, 2.0 μm for three latexes, and 2.35 μm for the fifth latex. The latexes were thrice cleaned with ethanol through centrifugation-decantation and resuspended in ethanol for about 10% solids content.

TABLE 2

Recipe for synthesizing poly(styrene/methacrylic acid) copolymer core

| Ingredient | Recipe I (phm) | Recipe II (phm) | Recipe III (phm) | Recipe IV (phm) |
|---|---|---|---|---|
| EtOH (200 proof) | 675.2 | 635.8 | 571.4 | 500.0 |
| Styrene | 100.0 | 100.0 | 100.0 | 100.0 |
| Methacrylic Acid | 1.0 | 0.6 | 0.6 | 1.0 |
| PVP K30 | 16.0 | 18.7 | 20.0 | 18.7 |
| NADOSS | 5.05 | — | — | — |
| AIBN | — | 1.0 | 1.0 | 1.0 |
| ACVA | 1.0 | — | — | — |
| Temp. ° C. | 70 | 70 | 70 | 70 |
| Agitation (rpm) | 70 | 200 | 70 | End-over-end |
| Time (hours) | 27 | 21 | 24 | End-over-end |
| Conversion (%) | 95.7 | 93.4 | 97.5 | 94.0–96.0 |
| Particle size (μm) | 2.35 | 2.81 | 2.57 | 2.0–2.2 |

EXAMPLE 1

Synthesis of Fluorescent Green Dye-Encoded Cross-Linked Microparticles (Dye/Polymer=1.667 mg/g)

Figure 2:
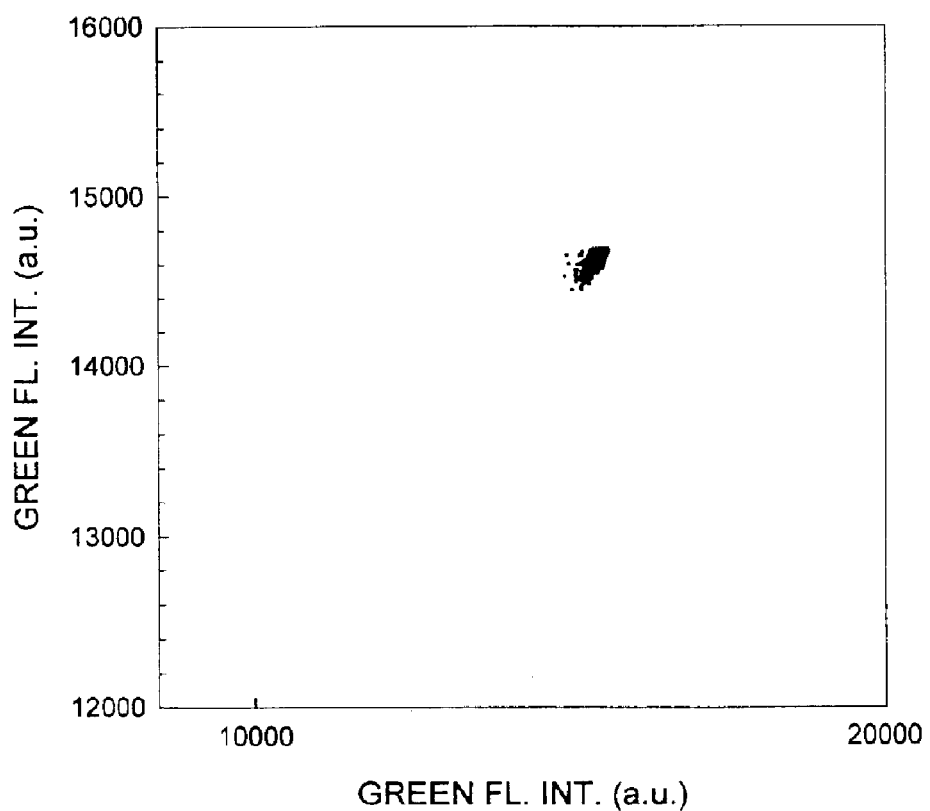
FIG. 2 is a plot of the fluorescence of the collection of particles prepared according to Example 1, below.

A two ml latex emulsion containing 0.2 g of cross-linked core-shell particles (Bangs Laboratories, Inc., 3.2 μm, 10% solids, 12.5% divinylbenzene) was cleaned of emulsifier by adding 1 ml ethanol and centrifuged at 6500 rpm for 2 min. This operation was repeated 3 times. The cleaned polymer particles were transferred to a 100 ml round bottom flask filled with 6 ml of a water solution of 1.0 wt % polyvinyl alcohol, 4 ml of a water solution of 0.75 wt % SDS and 19 ml ethanol. To this mixture, 1.5 ml of $CH_2Cl_2$ containing 0.3334 mg of fluorescent green dye, Bodipy FL C5, SE (4,4-difluoro-5,7-dimethyl-4-bora-3a,4a-diaza-s-indacene-3-pentanoic acid, succinimidyl ester, Mw=417.22, Molecular Probes) was added. Under 70 rpm agitation, 53 ml of distilled deionized water (an amount sufficient for complete uptake of the dye by the microparticles), was fed at a constant rate of 26.5 ml/h using a syringe pump. The particle suspension was then transferred to a rotary evaporator and the solvents were removed under vacuum (26.5 Hg inches) at 40° C. The concentrated colored suspension was collected and centrifuged at 6500 for 2 min. and the supernatant discarded. The microparticle pellet was washed by centrifugation for 3 times with 5 ml ethanol each time. Finally, the cleaned colored beads were dispersed in 2 ml of 0.2 wt. % SDS solution. The intensity and the homogeneity of the green fluorescence was measured with a custom built Nikon fluorescent microscope (Nikon Eclipse E-600FN epifluorescence microscope equipped with 150 W xenon-arc lamp and Nikon 20×0.75 NA air objective fitted with an optimized set of filter cubes for the selection of fluorophores). Images were recorded with a cooled 16 bit CCD camera (Apogee Instruments Inc.) and image acquisition software. User interfaced programs for collection and analysis of images and assay results were developed using MATLAB™ software that was run on a PC. The results are shown as dots in the plot of FIG. 2.

EXAMPLE 2

Non-Cross-Linked Copolymer Particles Containing Fluorescent Green Dye (Dye/Polymer=0.30 mg/g)

The procedure of Example 1 was followed, except that the particles were synthesized as in Preparative Example 3, recipe IV (Table 2), the green dye amount in the $CH_2Cl_2$ solution was 0.6 mg and the experiment was 5 times scaled-up and run in a 500 ml round bottom flask. Two identical experiments dyeing 2.2 μm particles and 2.0 μm particles were performed. The green intensity was 13232 for the 2.2 μm particles and 7940 for the 2.0 μm particles. The colored particles were resuspended after cleaning in a 1:1 solution of 0.2% PVP K-30 and 0.02% NaDOSS for a 5% solid content.

EXAMPLE 3

Cross-Linked Particles Encoded With 1:1 Weight Ratio of Fluorescent Green and Orange Dyes (Green Dye/Polymer=0.07, 0.17, and 0.75 mg/g; Orange Dye/Polymer=0.153 mg/g)

The procedure of Example 1 was followed, except that the polymer particles were synthesized as in Preparative Ex. 1., and the dichloromethane dye solution contained a mixture of two dyes, the green mentioned above, and a fluorescent orange dye, Bodipy 558/568, SE (4,4-difluoro-5-(2-thienyl-4-bora-3a,4a-diaza-s-indacene-3-propionic acid, succinimidyl ester, Mw=443.23, supplied by Molecular Probes Inc.). The concentration of the dyes was varied for each experiment, as is shown in Table 3. The feed rate of water was maintained at 26.5 ml/h. The final particles were evaluated by reading their green and orange fluorescent intensities according to the procedure as described in Ex. 1. The results are summarized in Table 3.

TABLE 3

Green and Orange Fluorescent Intensities from Ex. 3 (26.5 ml/h water feed rate)

| Run | Reaction time Hours | [Green]$_i$/ polymer mg/g | [Green]$_i$/ polymer mmol/g × 10$^{-3}$ | [Orange]$_i$/ polymer mg/g | [Orange]$_i$/ polymer mmol/g × 10$^{-3}$ | Feed water/ polymer ml/h | Green intensity in particles (a.u.) | Orange intensity in particles (a.u.) |
|---|---|---|---|---|---|---|---|---|
| A | 2.0 | 0.07 | 0.16 | 0.07 | 0.15 | 265.0 | 518.0 | 460.0 |
| B | 2.0 | 0.17 | 0.39 | 0.17 | 0.37 | 265.0 | 5668 | 6213 |
| C | 2.0 | 0.75 | 0.75 | 0.75 | 1.69 | 265.0 | 11797 | 15561 |

EXAMPLE 4

Non-Cross-Linked Particles Encoded by Combination of Three Fluorescent Dyes: Green, Orange and Red Four experiments, similar to that described in Example 3, were performed except that the polymer particles were synthesized as in Preparative Example 3, recipe I (Table 2) and three dyes were used, namely, the green fluorescent dye Bodipy FL C5, SE, the orange fluorescent dye Bodipy 558/568, SE, and a fluorescent red dye, Bodipy 630/650 methyl bromide (8-bromomethyl-4,4-difluoro-3,5-bis-(2-thienyl)-4-bora-3a,4a-diaza-s-indacene, Mw=449.14, Molecular Probes, Inc.). Three different dual combinations and a ternary composition containing all three dyes were used to make four separate sets of color-encoded microspheres. The conditions and results of these four experiments are presented in Table 4.

TABLE 4

Condition and results for Example 4

| Run | [Green] mg/g | [Green] mmol/g × $10^{-3}$ | [Orange] mg/g | [Orange] mmol/g × $10^{-3}$ | [Red] mg/g | [Red] mmol/g × $10^{-3}$ | Green Intensity in particles a.u. | Orange Intensity in particles a.u. | Red Intensity in particles a.u. |
|---|---|---|---|---|---|---|---|---|---|
| O-G | 0.28 | 0.7 | 0.28 | 0.6 | — | — | 3218 | 4384 | — |
| O-R | — | — | 0.28 | 0.6 | 0.280 | 0.7 | — | 2456 | 957 |
| O-R-G | 0.24 | 0.6 | 0.24 | 0.7 | 0.235 | 0.7 | 2410 | 2658 | 576 |
| G-R | 0.28 | 0.7 | — | — | 0.280 | 0.7 | 4403 | — | 885 |

EXAMPLE 5

Non-Cross-Linked Particles Encoded by Combination of Four Fluorescent Dyes: Green, Orange, Red and Blue Three experiments, similar to that described in Example 3, except that the polymer particles were synthesized as in Preparative Example 3, recipe III (Table 2) and four dyes were used: Green, orange and red, same as mentioned above, and a fluorescent blue dye, MDCC (7-diethylamino-3-(((2-maleimidyl)ethyl)amino)carbonyl)coumarin, Mw=383.4, Molecular Probes, Inc.). One experiment utilized a combination of the blue and green dyes. Another experiment utilized a combination of the blue, orange and red dyes. A third experiment utilized all four dyes. The results and dye concentrations are shown in Table 5. CV=coefficient of variation.

TABLE 5

Conditions and results for Example 5

| Run | [Blue] mg/g | [Green] mg/g | [Orange] mg/g | [Red] mg/g | Blue in particles Intensity a.u. | Blue in particles CV % | Green in particles Intensity a.u. | Green in particles CV % | Orange in particles Intensity a.u. | Orange in particles CV % | Red in particles Intensity a.u. | Red in particles CV % |
|---|---|---|---|---|---|---|---|---|---|---|---|---|
| B-G | 0.38 | 0.38 | — | — | 6607 | 10.5 | 10.5 | 11.9 | 11.9 | — | — | — |
| B-O-R | 0.38 | — | 0.38 | 0.38 | 8112 | 13.7 | — | — | — | 1.5 | 12512 | 5.4 |
| B-O-R-G | 0.20 | 0.20 | 0.2 | 0.2 | 6688 | 7.4 | 7.4 | 11.1 | 11.1 | 7.4 | 8328 | 8.0 |

EXAMPLE 6

Core-Shell Green Dye-Encoded Particles Formed by Semi-Continuous Polymerization (4.2% MAA; Shell/Core=2.4 (wt); Monomers Feeding Time=3 hours)

A. COOH-Functionalized Core-Shell Particle Preparation 0.5 g green uncross-linked copolymer particles (2.2 μm, suspended in 4.8 g of a distilled water solution of 0.2% PVP and 0.02% NaDOSS), were placed in a 50 ml round bottom glass flask, equipped with an agitator and $N_2$ inlet-outlet adapter in a thermostated water bath. The $N_2$ was flushed for 15 min. through the flask. Separately, 1.2 g of a monomer mixture containing 1.06 g (88.6%) fresh distilled methyl methacrylate (MMA), 0.08 g (7.2%) 2-ethyl hexyl methacrylate and 0.05 g (4.2%) methacrylic acid (MAA) was prepared. Then, 0.2 g of this monomer mixture, along with 0.03 g of t-butyl peroxy-2-ethylhexanoate (Luperox 26, ATOFINA) was added to the flask. The mixture was agitated at 70 rpm at room temperature for 1 hour. The water bath temperature was raised to 45° C. and 0.02 g sodium formaldehyde sulfoxylate (SFS, Aldrich), 0.001 g ethylene diaminetetraacetate-iron sodium complex (Aldrich) in 3.2 g water solution of 0.2% PVP and 0.02% NaDOSS and 0.016 g $CuCl_2$ $2H_2O$ dissolved in 1 g of the same emulsifier mixture solution were added to the flask. The second portion of monomer mixture, 1.0 g, was fed for 3 hours using a syringe pump, at a rate of 0.356 ml/h. After the monomer feeding was completed, the reaction was allowed to run for 2 hours more. The latex was transferred to a 23 ml glass vial and centrifuged at 1000 rpm for 10 min. The supernatant was removed and the particles were cleaned with a 0.1% Tween solution (pH 10), for 3 times, by mixing in a roller for 10 hours, followed by centrifugation and decantation. Finally the particles were suspended in 0.1% Tween solution to give a 10% solids content. The mean core-shell particle diameter was 5.35 μm and monodispersity was very close to 1.

B. Determination of Binding Capacity

The particle binding capacity of the core-shell particles was measured as follows, using a conjugate of biotin and the cyanine dye Cy5.5: [5'-/Cy5.5/TTTTT/TEG-Biotin]. The conjugate consists of the Cy5.5 dye linked to biotin through oligo(dT)$_5$ and the TEG spacer (TEG-Biotin=1-Dimethoxytrityloxy-3-O-(N-biotinyl-3-aminopropyl)-triethyleneglycolyl-glyceryl-2-O-(2cyanoethyl)-(N,N-diisopropyl)-phosphoramidite). A working solution of the conjugate (Biotin-oligo(dT)-Cy5.5) at a concentrations of 26.7 ng/μl in phosphate-buffered saline (PBS) was prepared. A biotin-binding protein (NeutrAvidin™) was attached to the COOH-functionalized core shell particles according to the procedure of Example 16, below. One hundred microliters of the NeutrAvidin™—functionalized particle suspension (1% solids) was added to a 1.5 ml Eppendorf tube. Nine hundred μl of PBS, along with 50 μl of PBST (150 mM NaCl, 100 mM sodium phosphate, pH 7.2 with 0.05% Tween-20), were added to the particles and mixed by vortexing. The resultant suspension was centrifuged at 7500 rpm for 3 minutes. The supernatant was discarded and the pellet carefully resuspended in 980 μl of PBS. Twenty microliters of Biotin-oligo(dT)-Cy5.5 working solution prepared as above was added to the bead suspension. The suspension was mixed well and incubated for 30 minutes at room temperature with shaking. Following this, 50 μl of PBST was added and the suspension centrifuged at 7500 rpm for 3 minutes. The supernatant was discarded and the pellet re-suspended in PBST. This process was repeated two times. The particles were resuspended in 100 μl 10 mM Tris buffer and assembled on a Si substrate. Particle fluorescence intensity was recorded as in Example 1. The fluorescence intensity was found to be 3910 (green fluorescence). The binding capacity was found to be 2782 (Cy5.5 dye).

EXAMPLE 7

Core-Shell Green Dye-Encoded Particles Formed by Semi-Continuous Polymerization (15.4% MAA; Shell/Core=1.3 (wt); Monomers Feeding Time=2 Hours)

A. Particle Synthesis

The procedure of Example 6, part A., was followed, except that the green core particles were 2.0 μm and the shell-forming monomer composition contained 78.8% MMA, 5.8% HEMA and 15.4% MAA. The shell-forming monomer composition was added to the core polymer particle suspension in two stages, as in Example 6, part A. A first portion (0.65 g) was added before starting polymerization. A second portion (0.49 g) was continuously fed for 2 hours at a rate of 0.26 ml/h. The resulting carboxylated core-shell particles had an average number diameter of 3.0 μm and a polydispersity close to 1. The green intensity was 5500 and the binding capacity 2858.

B. Determination of Carboxyl Surface Group Content

The carboxyl surface group content was measured by conductometric titration as follows. A Schott Gerate TA 100 conductometer was used to carry out surface charge measurements. The apparatus used consisted of two automatic constant flow-rate burettes (Sargent Welch) that delivered 0.02N NaOH and 0.02N HCl solutions at a flow rate of 1 ml/min. The titration cell consisted of a 250 ml Pyrex glass beaker covered loosely by a plastic cover that contained holes for two Pt-electrodes (circular type), a burette tip and an inlet for argon purging. A magnetic stirrer continuously stirred the beaker contents. The electrodes were totally submerged in the latex dispersion (0.1–0.2 g solids in 150 ml fresh deionized water). The conductivity electrode leads were connected with a conductometric analyzer, which was capable of continuously producing an amplified voltage signal directly proportional to the conductivity of the latex dispersion tested. The voltage output signals of the conductometric analyzer were registered continuously on a chart recorder.

The latex dispersions were first forward titrated with the NaOH solution and immediately re-titrated with the HCl solution. The end points of the conductometric titration curve are determined by extrapolating the linear legs of the titration curve; the intersections give the endpoints. By back-titration with HCl the carboxylic groups can be estimated. Knowing the particle diameter and the amount of carboxylic groups per gram of solid latex it is possible to calculate the surface concentration of carboxylic groups as well as the parking area per COOH group. The COOH content was $5.9 \times 10^5$ (moles/g) which gives a parking area of 5.12 $Å^2$/COOH.

EXAMPLES 8–10

Core-Shell Green Dye-Encoded Particles by Batch Polymerization (12%, 16% and 20% MAA; Shell/Core=1.4 (wt))

Three parallel experiments, with three different shell-forming monomer compositions were run as follows. In each of three 15 ml glass vials, 0.25 g of green particles synthesized in Example 2 (2.0 μm) were placed with a monomer mixture of variable composition (Table 6), the oil-soluble initiator or hydrophobic oxidant tert-butylperoxy-2-ethylhexanoate (BPH) and de-ionized water containing 0.2 wt. % PVP, and 0.02 wt. % bis(2-ethylhexyl) sulfosuccinate, sodium salt (Aerosol OT). The vials were placed on a roller and homogenized for at least 1 hour. A solution containing the hydrophilic water-soluble reducing agent SFS/$Fe^{+2}$ chelate (sodium formaldehyde sulfooxylate/$Fe^{+2}$) and the water-soluble radical scavenger $CuCl_2$ was added to the particles and the vials were placed in a water bath shaker thermostated at 45° C. under agitation. After 6 hour, the resulting core-shell particles were washed and characterized as is described in Examples 5 and 7. The mean particle diameter, green intensity and binding capacity values are presented in Table 6.

TABLE 6

Core-shell bottle polymerization recipe for Examples 8–10 (shell/core = 1.4 (wt.))

| Ingredients | | Example 8 | Example 9 | Example 10 |
|---|---|---|---|---|
| Core, g | | 0.25 | 0.25 | 0.25 |
| DI Water + 0.2% PVP + 0.02% AOT | | 5.0 | 5.0 | 5.0 |
| Comonomers, g | | 0.35 | 0.35 | 0.35 |
| Comonomers, % | MMA, % | 81.4 | 77.7 | 74.0 |
|  | HEMA, % | 6.6 | 6.3 | 6.0 |
|  | MAA, % | 12.0 | 16.0 | 20.0 |
| BPH, g | | 0.014 | 0.014 | 0.014 |
| SFS, g | | 0.007 | 0.007 | 0.007 |
| $Na_2Fe$, g | | 0.0005 | 0.0005 | 0.0005 |
| $CuCl_2$ $2H_2O$ | | 0.008 | 0.008 | 0.008 |
| Diameter (μm) | | 2.86 | 2.86 | 2.68 |
| Green Intensity, a.u. | | 2329 | 3252 | 3890 |
| Binding Capacity | | 1858 | 2570 | 3317 |

EXAMPLE 11

Core-Shell Green Dye-Encoded Particles by Bath Polymerization (20% MAA; Shell/Core=1 (wt))

Two identical experiments were run in parallel in two 23 ml glass vials. To each vial was added 3.89 g suspension (19.3%) of green particles prepared from 2.81 μm non-cross-linked core polystyrene particles with green dye loading of 0.3 mg dye/g of particle, 13.8 ml of 0.2% PVP and 0.02% NaDOSS solution, 0.75 g monomer mixture (74% MMA, 6% HEMA and 20% MAA) along with 0.0225 g of oil soluble initiator (BPH). The vials were placed in a roller and agitated for 10 hours. To each vial, was added 0.0225 g SFS and 0.0015 $Na_2Fe$ EDTA (ethylene diamine tetra acetic acid) chelate dissolved in 0.2 ml solution of PVP-NaDOSS and 0.024 g $CuCl_2.2H_2O$ dissolved in 1 ml PVP-Aerosol OT solution. The vials were placed in a water bath shaker maintained at 45° C. The polymerization was allowed to proceed under slight agitation for 6 hours. The resulting core-shell green particles were washed and characterized for mean particle diameter. Surface carboxyl group content, green intensity and binding capacity were determined as above.

TABLE 7

Characteristics and reproducibility of core-shell green encoded particles synthesized in parallel experiments

| Sample | Particle Diameter ($\mu$m) | COOH Conc. (mmoles/g) | Parking Area (Å$^2$/COOH) | Green Intensity In Particles (a.u.) | Binding Capacity (a.u.) |
|---|---|---|---|---|---|
| 1 | 3.38 | 1.86 10$^{-4}$ | 1.47 | 7659 | 7442 |
| 2 | 3.32 | 1.82 10$^{-4}$ | 1.52 | 7332 | 6247 |

EXAMPLE 12

Core-Shell Particles Encoded With Green and Orange Fluorescent Dyes in a Semi-Continuous Process (16.25% MAA; Shell/Core=1.6 (wt.))

EXAMPLE 13

Core-Shell Particles Encoded With Blue and Orange Fluorescent Dyes in a Batch Process (20% MAA; Shell/Core=1 (wt.))

Green-orange-encoded core-shell particles were made according to a synthesis similar to Example 7 except that the core particles were encoded with green and orange, and the comonomer mixture was 0.8 g, consisting of 77.5% MMA, 6.28% HEMA and 16.25% MAA. From this mixture, 0.2 g was added to the particles along with 0.024 g initiator. The remaining 0.6 g were fed over the duration of one hour. The blue-orange encoded core-shell particle synthesis was similar to Example. 11, except that the core was encoded with blue and green fluorescent dye, as was described in Example 9. The final particle properties are shown in Table 8.

TABLE 8

Characterization results for core-shell encoded particles prepared in Examples 12–13

| Ex. | Particle Diameter ($\mu$m) | Blue Intensity (a.u.) | Green Intensity in Particles (a.u.) | Orange Intensity in Particles (a.u.) | Parking Area (Å$^2$/COOH) | Binding Capacity (a.u.) |
|---|---|---|---|---|---|---|
| 15 | 3.2 | — | 3105 | 3325 | — | 2667 |
| 16 | 3.0 | 1602 | 4048 | — | 1.28 | 5242 |

EXAMPLE 14

Core-Shell Particles Encoded With Blue, Orange and Red Fluorescent Dyes in a Batch Polymerization Process (Shell/Core=1 (wt.))

The procedure of Example 11 was followed except that the core was encoded with three fluorescent dyes (blue, orange and red), according to the procedure described in Example 5. The final core-shell encoded particles were characterized as follows: Diameter=3.08 $\mu$m; parking area= 2.66 Å$^2$/COOH; blue intensity=5956; orange intensity= 8740; red intensity=9265; and binding capacity=5452.

EXAMPLE 15

Core-Shell Particles Encoded With Blue, Orange, Green and Red Fluorescent Dyes in a Batch Polymerization Process (Shell/Core=1 (wt.))

The procedure of Example 11 was followed except that the core was encoded with four fluorescent dyes (blue, orange, green and red), according to the procedure described in Example 5. The final core-shell encoded particles were characterized as follows: Diameter=3.06 $\mu$m; parking area= 2.22 Å$^2$/COOH; blue intensity=1460; orange intensity= 4140; red intensity=5443; and binding capacity=4153.

EXAMPLE 16

Attachment of Protein to Color-Encoded Core Shell Particles

Thirty milligrams of beads from a parent latex suspension (Example 11, sample #2) were taken in a 1.5 ml Eppendorf tube and washed once with 10 mM borate buffer (pH=8.5) and twice with 0.1 M 2-(N-morpholino)-ethanesulfonic acid (MES) buffer (pH=4.5) by repeated centrifugation and decantation. The pellet was resuspended in 600 $\mu$l of coupling buffer (0.1M MES, pH=4.5) and mixed by vortexing. Three milligrams of NeutrAvidin™ biotin-binding protein (Pierce) was re-hydrated by adding 300 $\mu$l of the coupling buffer and the solution added to the particle suspension and sonicated with a probe sonicator briefly. A stock solution of 1-ethyl-3-(3-dimethylaminopropyl)-carbodiimide (EDAC) (Aldrich) 200 $\mu$g/$\mu$l in MES buffer was prepared and 150 $\mu$l of the solution added to the bead suspension with NeutrAvidin™. The suspension was rotated end over end for two hours at room temperature. The suspension was centrifuged and washed once with 600 $\mu$l coupling buffer and twice in 600 $\mu$l of 10 mM borate buffer. Following this, the pellet was washed with 1.5 ml of blocking buffer (150 mM NaCl, 100 mM sodium phosphate, 0.1% bovine serum albumin, 0.05% Tween-20, 10 mM EDTA and 0.1% NaN$_3$, pH 7.2) and then resuspended in 600 $\mu$l blocking buffer and incubated for 1 hour at 37° C. The suspension was centrifuged and then resuspended in blocking buffer to give a 1% solids suspension of fluorescent dye-encoded core-shell particles having biotin-binding protein coupled thereto.

EXAMPLE 17

Attachment of DNA to Color-Encoded Core Shell Particles

Biotinylated oligonucleotides with known nucleotide sequence were coupled to color-encoded core-shell particles from Example 16 that were previously surface coated with NeutrAvidin™ biotin-binding protein as in Example 16. The coupling reaction was carried out in 1% solution of 50 $\mu$l of NeutrAvidin™-coated particle solution in 0.1 ml reaction buffer (150 mM NaCl, 0.05 M EDTA, 0.5% bovine serum albumin, 0.5 mM Tris-HCl, and 100 mM sodium phosphate, pH 7.2) with 0.4 $\mu$M biotinylated oligonucleotides and approximately 7×10$^5$ particles. The coupling reaction mixture was incubated at room temperature for 30 minutes with vortexing. Upon completion of the coupling reaction, the particles were collected by centrifugation, washed three times with PBST (150 mM NaCl, 100 mM sodium phosphate, pH 7.2 with 0.05% Tween-20) and resuspended in 0.2 ml PBS (150 mM NaCl, 100 mM sodium phosphate, pH 7.2). The above-described procedure can be utilized to couple any biotinylated oligonucleotides of interest to biotin-binding protein-coupled particles.

EXAMPLE 18

Oligonucleotide Hybridization Assay With Color-Encoded Core Shell Particles

Figure 3:
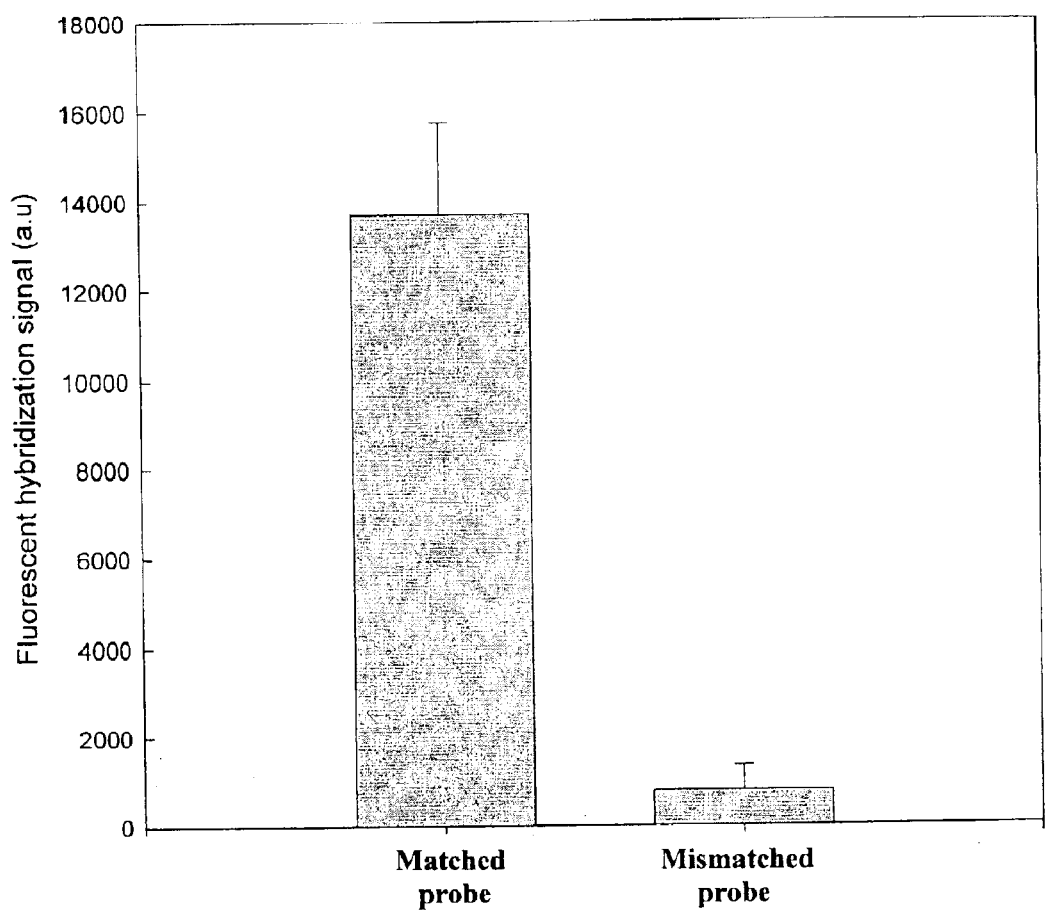
FIG. 3 is a plot of the fluorescence of the collection of particles prepared according to Example 18, below.

One microliter of a 10 $\mu$M solution of a synthetic target of oligo(A)$_{10}$ linked to the cyanine dye Cy3 through the C9 spacer HOCH$_2$OCH$_2$CH$_2$OCH$_2$CH$_2$PO$_4^{-2}$ (oligo(A)$_{10}$/C9spacer/Cy3) in deionized water was diluted with 19 µL of 1×TMAC (4.5M tetramethyl ammonium chloride, 75 mM Tris pH 8.0, 3 mM EDTA, 0.15% SDS) to reach 20 µL. A silicon substrate with pre-assembled oligonucleotide-functionalized encoded core-shell particles (two types of particles were used: one functionalized with a complementary probe sequence Biotin-TEG$_3$-oligo(dT)$_{18}$ and the other with a mismatched probe sequence Biotin-TEG$_3$-oligo(C)$_{18}$ was taken and the 20 µl sample of the synthetic target added to the substrate surface. (Biotin-TEG=1-Dimethoxytrityloxy-3-O-(N-biotinyl-3-aminopropyl)-triethyleneglycolyl-glyceryl-2-O-(2-cyanoethyl)-(N,N-diisopropyl)-phosphoramidite.) The substrate was put in a 53° C. heater for 15 minutes with shaking at 30 rpm. The slide was taken out of the heater, and sample was pipetted away. The substrate was washed once with 1×TMAC at room temperature. Following this 10 µl of 1×TMAC was added to the substrate surface, which was covered with a cover-slip. Fluorescence intensity was analyzed as described in Example 1. The results are shown in FIG. 3.

EXAMPLE 19

Preparation of Encoded Magnetic Particles

A. Synthesis of Aqueous Ferrofluid

Stock solutions of 1M FeCl$_3$ in 1N HCl and 2M FeCl$_2$ in 1N HCl were prepared. In a 100 ml glass bottle, 4 ml of 1M FeCl$_3$ and 1 ml of 2M FeCl$_2$ solution were combined 400 ml of deionized distilled water and 100 ml of a 30% (wt) NH$_4$OH solution were mixed to give 500 ml of about 1.7 M solution of NH$_3$ in water. Fifty ml of the ammonia solution was added slowly to the glass bottle containing the iron salt solutions under vigorous agitation. Following completion of this step, 2 ml of a 25% (wt) solution of tetramethyl ammonium hydroxide was added and the solution sonicated for about 1 hr. Following this, the ferrofluid was allowed to settle overnight under the influence of a magnetic field. Next, the, supernatant was decanted and the precipitate washed with distilled water. The iron oxide nanoparticle suspension in deionized water was homogenized and allowed to settle overnight under the influence of gravity. Following settling, the precipitate was discarded and the dark colored supernatant collected as the final ferrofluid suspension.

B. Synthesis of Encoded Magnetic Particles

Colored polymer microparticles of identical dye content and about 3 microns in diameter were prepared according to methods described herein to comprise a polystyrene core and a methyl methacrylate (MMA), hydroxyethylmethacrylate (HEMA) and methacrylic acid (MAA) shell The particles were dispersed in de-ionized water to give 1 ml of a about 1% suspension and a 50 microliter aliquot of the ferrofluid suspension was added to it. The suspensions were admixed with end-over-end rotation for 48 hours at room temperature. The resultant solution was centrifuged at about 200 g for 10 minutes. A tan colored particle pellet was separated from the brownish red colored supernatant containing the excess ferrofluid. The supernatant was discarded and the pellet resuspended in 1% SDS solution and centrifuged again. This step was repeated two times and the pellet finally redispersed in PBS buffer with 0.5% Tween-20. The 1 ml particle suspension was taken in a standard 1.5 ml standard eppendorf tube and the tube was mounted on a Promega Multitube Magnetic Stand. Complete separation of the suspended particles (as a pellet on the wall of the tube) took place in about 10 minutes.

All references discussed herein are incorporated by reference. One skilled in the art will readily appreciate that the present invention is well adapted to carry out the objects and obtain the ends and advantages mentioned, as well as those inherent therein. The present invention may be embodied in other specific forms without departing from the spirit or essential attributes thereof and, accordingly, reference should be made to the appended claims, rather than to the foregoing specification, as indicating the scope of the invention.

What is claimed is:

1. A method of incorporating at least one dye into polymer microparticles comprising:
   (a) providing:
   (i) at least one first solvent in which the dye and the microparticle polymer are soluble;
   (ii) at least one second solvent in which the dye and the microparticle polymer are not or only weakly soluble, said first and second solvents being immiscible or at most partially miscible;
   (iii) at least one third solvent in which the dye and the microparticle polymer are not or only weakly soluble, said third solvent being miscible with the first and second solvents;
   (b) suspending the polymer microparticles in a designated volume of a mixture comprising at least one second solvent and at least one third solvent;
   (c) adding to said polymer microparticle suspension a dye solution comprising at least one first solvent and at least one dye dissolved therein, the amount of dye corresponding to the desired final state of dye incorporation in the microparticles;
   (d) adding to said polymer microparticle suspension at least one second solvent to induce substantially complete partitioning of the dye from the suspension liquid phase to the microparticles.

2. The method according to claim 1 wherein the rate of addition of the second solvent to the polymer microparticle suspension in step (d) is controlled to maintain phase stability in the suspension.

3. The method according to claim 1 wherein the mixture comprising the least one second solvent and the at least one third solvent further comprises at least one suspension stabilizer.

4. The method according to claim 1 wherein the dye is a fluorescent dye.

5. The method according to claim 4 wherein the dye is a hydrophobic dye.

6. The method according to claim 5 wherein the dye is selected from the group consisting of styryl dyes, pyrromethane dyes, coumarin dyes, and combinations thereof.

7. The method according to claim 1 wherein the microparticles comprise a hydrophobic polymer.

8. The method according to claim 7 wherein the polymer is a homopolymer or copolymer comprising a vinyl-containing monomer.

9. The method according to claim 7 selected from the group consisting of homopolymers or copolymers of polystyrene, poly(methyl methacrylate), polyacrylamide, poly(ethylene glycol), poly(hydroxyethylmethacrylate), poly(vinyltoluene), poly(divinylbenzene), and combinations thereof.

10. The method according to claim 8 wherein the polymer is polystyrene or copolymer thereof containing at least 50% by weight styrene monomer units.

11. The method according to claim 10 wherein the polymer is a styrene/methacrylic acid copolymer.

12. The method according to claim 8 wherein the polymer is non-cross-linked.

13. The method according to claim 8 wherein the microparticles have a diameter of from about 0.1 to about 100 microns.

14. The method according to claim 1 wherein the particles are monodisperse.

15. The method according to claim 1 wherein the concentration of dye present in the microparticle suspension formed by contacting microparticles with said dye solution is from about 10 $\mu$g/g to about 100 $\mu$g/g, based upon the weight of the microparticle suspension.

16. The method according to claim 15 comprising a solvent wherein the first solvent is selected from the group consisting of methylene chloride, chloroform, tetrahydrofuran, dioxane, cyclohexane, benzene, toluene, butylacetate, lower chlorinated aliphatic hydrocarbons, and combinations thereof; the second solvent is water; and the third solvent is selected from the group consisting of acetone, lower alcohols, and combinations thereof.

17. The method according to claim 16 wherein the first solvent is methylene chloride or dichloromethane.

18. The method according to claim 17 wherein the third solvent is an alcohol.

19. The method according to claim 1 wherein the microparticle is a core-shell microparticle comprising a central core comprising one or more core polymers surrounded by a shell comprising one or more shell polymers.

20. The method according to claim 19 wherein the core polymer comprises a copolymers of styrene and a monomer more hydrophilic than styrene.

21. The method according to claim 19 wherein the core polymer comprises methacrylic acid.

22. The method according to claim 19 wherein the shell surface comprises one or more functional groups selected from the group consisting of sulfate, phosphate, hydroxyl, carboxyl, ester, amide, amidine, amine, sulfhydryl and aldehyde.

23. The method according to claim 19 wherein the shell surface comprises an attached oligonucleotide, polynucleotide, peptide or polypeptide.

24. The method according to claim 1 wherein at least a portion of the microparticles are magnetically responsive.

25. A method for producing fluorescent core-shell microparticles comprising:
(a) providing microparticle cores incorporating one or more fluorescent dyes;
(b) contacting said microparticle cores with a polymerization mixture comprising at least one polymerizable shell monomer, at least one free radical polymerization initiator comprising a water-insoluble oxidizing agent, and at least one water-soluble reducing agent;
(c) polymerizing said shell monomer to form a polymer shell around said microparticle core.

26. The method according to claim 25 wherein the polymerization mixture comprises an oil-in-water emulsion.

27. The method according to claim 25 wherein contacting the microparticle cores with the polymerization mixture comprises the steps of swelling the cores with a first mixture comprising said shell monomer and water-insoluble oxidizing agent to provide uptake of said first mixture into the cores, and then contacting the swelled microparticle cores with the water-soluble reducing agent.

28. The method according to claim 25 wherein the polymerization mixture further comprises at least one water-soluble free radical scavenger.

29. The method according to claim 25 wherein the shell monomer is more hydrophilic that the polymer comprising the microparticle core.

30. The method according to claim 29 wherein the microparticle core polymer comprises polystyrene or copolymer thereof and the shell monomer comprises methyl methacrylate.

31. The method according to claim 30 wherein the shell monomer comprises a mixture of methyl methacrylate, hydroxyethyl methacrylate and methacrylic acid.

32. The method according to claim 25 wherein the water-insoluble oxidizing agent is selected from the group consisting of hydrophobic organic peroxides and hydrophilic organic hydroperoxides.

33. The method according to claim 25 wherein the water-insoluble oxidizing agent is selected from the group consisting of cumenhydroperoxide and t-butylperoxy-2-ethylhexanoate.

34. The method according to claim 25 wherein the water-soluble reducing agent is selected from the group consisting of tetraethylenepentamine and sodium formaldehydesulfoxylate-Fe(II) ethylene diamine tetra acetic acid.

35. The method according to claim 25 wherein the microparticle cores have been stained with fluorescent dye according to the method of claim 1.

36. A method of preparing a library of dyed polymer microparticles comprising two or more sets of microparticles of different dye loading comprising:
forming a first set of microparticles according to the method of claim 1, the microparticles of said first set characterized by a first dye loading;
forming a second set of microparticles according to the method of claim 1, the microparticles of said second set characterized by a second dye loading different from said first dye loading.

37. The method according to claim 36 wherein the difference in dye loading between the microparticles of said first set and the microparticles of said second set comprises a difference in at least one of dye concentration and dye identity.

38. The method according to claim 37 wherein the difference in dye loading between the microparticles of said first set and the microparticles of said second set comprises a difference in dye concentration.

39. The method according to claim 37 wherein the difference in dye loading between the microparticles of said first set and the microparticles of said second set comprises a difference in dye identity.

40. The method according to claim 36 wherein the microparticles comprise non-cross-linked polymers.

41. The microparticle according to claim 40 wherein the dye is substantially uniformly distributed throughout said microparticle.

42. The method according to claim 36 wherein the first and second dye loadings comprise one or more fluorescent dyes.

43. The method according to claim 42 wherein the dyes are selected from the group consisting of styryl dyes, pyrromethane dyes, coumarin dyes, and combinations thereof.

44. The method according to claim 36 wherein the first and second dye loadings comprise one or more hydrophobic dyes.

45. The method according to claim 44 wherein the polymer is a homopolymer or copolymer comprising a vinyl-containing monomer.

46. The method according to claim to claim 44 wherein the polymer is a styrene/methacrylic acid copolymer.

\* \* \* \* \*

UNITED STATES PATENT AND TRADEMARK OFFICE
CERTIFICATE OF CORRECTION

PATENT NO. : 6,964,747 B2
APPLICATION NO. : 10/348123
DATED : November 15, 2005
INVENTOR(S) : Banerjee et al.

It is certified that error appears in the above-identified patent and that said Letters Patent is hereby corrected as shown below:

ON THE TITLE PAGE

In Item (75), delete "; Michael Seul, Fanwood, NJ (US)"

In Item (73), after "Bioarray Solutions, Ltd., Warren, NJ (US)", insert -- ; Lehigh University, Bethlehem, PA (US) --

IN THE SPECIFICATION

In col. 2, line 35, change "at 80 C by" to read --at 80°C by --

In col. 8, line 48, change "dioctyl maleate, dioctyle maleate or diethyl maleate;" to read --dioctyl maleate or diethyl maleate; --

In col. 10, lines 32, change "such as p-bis(o-" to read --such as $p$-bis($o$- --

In col. 25, line 2, change "was diluted with 19 µL of" to read --was diluted with 19 µl of --

In col. 25, line 4, change "to reach 20 µL" to read -- to reach 20 µl --

IN THE CLAIMS

In Claim 3, col. 26, line 42, change "comprising the least one" to read --comprising the at least one --

In Claim 9, col. 26, line 57, change "according to claim 7 selected from" to read --according to claim 7 wherein the polymer is selected from--

UNITED STATES PATENT AND TRADEMARK OFFICE
CERTIFICATE OF CORRECTION

PATENT NO.        : 6,964,747 B2
APPLICATION NO. : 10/348123
DATED             : November 15, 2005
INVENTOR(S)       : Banerjee et al.

It is certified that error appears in the above-identified patent and that said Letters Patent is hereby corrected as shown below:

IN THE CLAIMS

In claim 41, col. 28, line 49, change "The microparticle according to claim 40"

to read --The method according to claim 40--

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 6,964,747 B2
APPLICATION NO. : 10/348123
DATED : November 15, 2005
INVENTOR(S) : Sukanta Banerjee et al.

It is certified that error appears in the above-identified patent and that said Letters Patent is hereby corrected as shown below:

Claim 32, column 28, line 10, change "hydrophilic" to --hydrophobic--.

Signed and Sealed this

First Day of September, 2009

David J. Kappos
*Director of the United States Patent and Trademark Office*